(12) United States Patent
Casas et al.

(10) Patent No.: US 11,842,530 B2
(45) Date of Patent: Dec. 12, 2023

(54) SYSTEMS AND METHODS FOR LATENT DISTRIBUTION MODELING FOR SCENE-CONSISTENT MOTION FORECASTING

(71) Applicant: UATC, LLC, San Francisco, CA (US)

(72) Inventors: Sergio Casas, Toronto (CA); Cole Christian Gulino, Pittsburgh, PA (US); Shun Da Suo, Toronto (CA); Katie Z. Luo, Sunnyvale, CA (US); Renjie Liao, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 393 days.

(21) Appl. No.: 17/150,995

(22) Filed: Jan. 15, 2021

(65) Prior Publication Data
US 2021/0276595 A1    Sep. 9, 2021

Related U.S. Application Data

(60) Provisional application No. 63/119,981, filed on Dec. 1, 2020, provisional application No. 62/985,862, filed on Mar. 5, 2020.

(51) Int. Cl.
*G06V 10/82* (2022.01)
*B60W 60/00* (2020.01)
(Continued)

(52) U.S. Cl.
CPC ......... *G06V 10/82* (2022.01); *B60W 60/0027* (2020.02); *G05D 1/0212* (2013.01);
(Continued)

(58) Field of Classification Search
CPC .... G06V 10/82; G06V 20/58; G06V 30/2504; G06V 30/19173; G08G 1/166; G05D 1/0212; G06F 18/2137; B60W 60/0027
(Continued)

(56) References Cited

U.S. PATENT DOCUMENTS 11,618,162 B2 *  4/2023  Cristache ............... B25J 9/163
                                        700/245
2019/0050648 A1 *  2/2019  Stojanovic ............. G06V 20/13
(Continued)

OTHER PUBLICATIONS

Alahi et al, "Social LSTM: Human Trajectory Prediction in Crowded Spaces", Conference on Computer Vision and Pattern Recognition, Jun. 26-Jul. 1, 2016, Las Vegas, Nevada, United States, 11 pages.
(Continued)

*Primary Examiner* — Yazan A Soofi
(74) *Attorney, Agent, or Firm* — Dority & Manning, P.A.

(57) ABSTRACT

A computer-implemented method for determining scene-consistent motion forecasts from sensor data can include obtaining scene data including one or more actor features. The computer-implemented method can include providing the scene data to a latent prior model, the latent prior model configured to generate scene latent data in response to receipt of scene data, the scene latent data including one or more latent variables. The computer-implemented method can include obtaining the scene latent data from the latent prior model. The computer-implemented method can include sampling latent sample data from the scene latent data. The computer-implemented method can include providing the latent sample data to a decoder model, the decoder model configured to decode the latent sample data into a motion forecast including one or more predicted trajectories of the one or more actor features. The computer-implemented method can include receiving the motion forecast including one or more predicted trajectories of the one or more actor features from the decoder model.

20 Claims, 13 Drawing Sheets

(51) Int. Cl.
  *G08G 1/16* (2006.01)
  *G05D 1/02* (2020.01)
  *G06V 20/58* (2022.01)
  *G06F 18/2137* (2023.01)
  *G06V 30/19* (2022.01)
  *G06V 30/24* (2022.01)

(52) U.S. Cl.
  CPC .......... *G06F 18/2137* (2023.01); *G06V 20/58* (2022.01); *G06V 30/19173* (2022.01); *G08G 1/166* (2013.01); *G06V 30/2504* (2022.01)

(58) Field of Classification Search
  USPC .......................................................... 701/25
  See application file for complete search history.

(56) References Cited

U.S. PATENT DOCUMENTS

| | | | |
|---|---|---|---|
| 2019/0135300 A1* | 5/2019 | Gonzalez Aguirre | G05D 1/0088 |
| 2019/0339770 A1* | 11/2019 | Kurlethimar | G02B 27/017 |
| 2020/0234066 A1* | 7/2020 | Lee | G06V 10/25 |
| 2020/0293041 A1* | 9/2020 | Palanisamy | G05D 1/0221 |
| 2020/0327674 A1* | 10/2020 | Yang | G06T 7/60 |
| 2021/0276595 A1* | 9/2021 | Casas | B60W 60/0027 |
| 2022/0075383 A1* | 3/2022 | Morad | G06V 20/56 |
| 2022/0417428 A1* | 12/2022 | Jeon | H04N 5/272 |

OTHER PUBLICATIONS

Bengio et al, "Scheduled Sampling for Sequence Prediction with Recurrent Neural Networks", arXiv:1506.03099v3, Sep. 23, 2015, 9 pages.
Caesar et al, "NuScenes: A Multimodal Dataset for Autonomous Driving", arXiv:1903.11027v5, May 5, 2020, 16 pages.
Casas et al, "IntentNet: Learning to Predict Intention from Raw Sensor Data", arXiv:2101.07907v1, Jan. 20, 2021, 10 pages.
Casas et al, "SpAGNN: Spatially-Aware Graph Neural Networks for Relational Behavior Forecasting from Sensor Data", arXiv:1910.08233v1, Oct. 18, 2019, 11 pages.
Chai et al, "Multipath: Multiple Probabilistic Anchor Trajectory Hypotheses for Behavior Prediction", arXiv:1910.05449v1, Oct. 12, 2019, 14 pages.
Cui et al, "Multimodal Trajectory Predictions for Autonomous Driving Using Deep Convolutional Networks", arXiv:1809.10732v2, Mar. 1, 2019, 7 pages.
Djuric et al, "Motion Prediction of Traffic Actors for Autonomous Driving Using Deep Convolutional Networks", arXiv; 1808.05819v1, Aug. 17, 2018, 10 pages.
Higgins et al, "β-VAE: Learning Basic Visual Concepts with a Constrained Variational Framework", International Conference on Learning Representations, Apr. 24-26, 2017, Toulon, France, 22 pages.
Hong et al, "Rules of the Road: Predicting Driving Behavior with a Convolutional Model of Semantic Interactions", arXiv:1906.08945V1, Jun. 21, 2019, 9 pages.
Hubmann et al, "Automated Driving in Uncertain Environments: Planning with Interaction and Uncertain Maneuver Prediction" Transactions on Intelligent Vehicles vol. 3, No. 1, Mar. 2018, pp. 5-17.
Huszar, "How (Not) to Train your Generative Model: Scheduled Sampling, Likelihood, Adversary?", arXiv:1511.05101v1, Nov. 16, 2015, 9 pages.
Jain et al, "Discrete Residual Flow for Probabilistic Pedestrian Behavior Prediction", arXiv:1910.08041v1, Oct. 17, 2019, 13 pages.
Jang et al, "Categorical Reparameterization with Gumbel-Softmax", arXiv:1611.01144v5, Aug. 5, 2017, 13 pages.
Kingma et al, "Auto-Encoding Variational Bayes", arXiv:1312.6114v10, May 1, 2014, 14 pages.
Klingelschmitt et al, "Managing the Complexity of Inner-City Scenes: An Efficient Situation Hypotheses Selection Scheme", Intelligent Vehicles Symposium (IV), 2015, 9 pages.
Lamb et al, "Professor Forcing: A New Algorithm for Training Recurrent Networks", arXiv:1610.09038v1, Oct. 27, 2016, 11 pages.
Lang et al, PointPillars: Fast Encoders for Object Detection from Point Clouds, arXiv:1812.05784V2, May 7, 2019, 9 pages.
Lee et al, "DESIRE: Distant Future Prediction in Dynamic Scenes with Interacting Agents", arXiv:1704.04394v1, Apr. 14, 2017, 10 pages.
Liang et al, "Multi-Task Multi-Sensor Fusion for 3D Object Detection", arXiv:2012.12397v1, Dec. 22, 2020, 11 pages.
Luo et al, "Fast and Furious: Real Time End-to-End 3D Detection, Tracking and Motion Forecasting with a Single Convolutional Net", arXiv:2012.12395v1, Dec. 22, 2020, 9 pages.
Ma et al, "Arbitrary Oriented Scene Text Detection via Rotation Proposals", arXiv:1703.01086v3, Mar. 15, 2018, 11 pages.
Okamoto et al, "DDT: Deep Driving Tree for Proactive Planning in Interactive Scenarios" In: 2018 21st International Conference on Intelligent Transportation Systems, Nov. 4-7, 2018, Maui, Hawaii, United States, pp. 656-661.
Osa, et al, "An Algorithmic Perspective on Imitation Learning", arXiv:1811.06711v1, Nov. 16, 2018, 188 pages.
Qi et al, "PointNet: Deep Learning on Point Sets for 3D Classification and Segmentation", arXiv:1612.00593v2, Apr. 10, 2017, 19 pages.
Ratliff et al, "Maximum Margin Planning", International Conference on Machine Learning, Jun. 25-29, 2006, Washington, United States, 8 pages.
Rhinehart et al, "PRECOG: PREdiction Conditioned on Goals in Visual Multi-Agent Settings", arXiv:1905.01296v3, Sep. 30, 2019, 24 pages.
Rhinehart et al, "R2P2: A ReparameteRized Pushforward Policy for Diverse, Precise Generative Path Forecasting", European Conference on Computer Vision, Sep. 8-14, 2018, Munich, Germany, 17 pages.
Ross et al, "A Reduction of Imitation Learning and Structured Prediction to No-Regret Online Learning", arXiv:1011.0686v3, Mar. 16, 2011, 9 pages.
Sadat et al, "Jointly Learnable Behavior and Trajectory Planning for Self-Driving Vehicles", arXiv:1910.04586v1, Oct. 10, 2019, 8 pages.
Schlichtkrull et al, "Modeling Relational Data with Graph Convolutional Networks", arXiv:1703.06103v4, Oct. 26, 2017, 9 pages.
Sohn et al, "Learning Structured Output Representation Using Deep Conditional Generative Models", Conference on Neural Information Processing Systems, Dec. 7-12, 2015, Montreal, Canada, 9 pages.
Tang et al, "Multiple Futures Prediction", arXiv:1911.00997v2, Dec. 6, 2019, 17 pages.
Yang et al, "PIXOR; Real-Time 3D Object Detection from Point Clouds", arXiv:1902.06326v3, Mar. 2, 2019, 10 pages.
Zeng et al, "End-to-End Interpretable Neural Motion Planner", arXiv:2101.06679v1, Jan. 17, 2021, 10 pages.
Zhou et al, "End-to-End Multi-View Fusion for 3D Object Detection in Lidar Point Clouds", arXiv:1910.06528v2, Oct. 23, 2019, 10 pages.

* cited by examiner

SYSTEMS AND METHODS FOR LATENT DISTRIBUTION MODELING FOR SCENE-CONSISTENT MOTION FORECASTING

CROSS-REFERENCE TO RELATED APPLICATIONS

The present application is based on and claims benefit of U.S. Provisional Patent Application No. 63/119,981 having a filing date of Dec. 1, 2020, and U.S. Provisional Patent Application No. 62/985,862 having a filing date of Mar. 5, 2020, both of which are incorporated by reference herein.

FIELD

The present disclosure relates generally to autonomous vehicles. More particularly, the present disclosure relates to systems and methods for latent distribution modeling for scene-consistent motion forecasting.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for determining scene-consistent motion forecasts from sensor data. The computer-implemented method can include obtaining, by a computing system including one or more computing devices, scene data including one or more actor features. The computer-implemented method can include providing, by the computing system, the scene data to a latent prior model, the latent prior model configured to generate scene latent data in response to receipt of scene data, the scene latent data including one or more latent variables. The computer-implemented method can include obtaining, by the computing system, the scene latent data from the latent prior model. The computer-implemented method can include sampling, by the computing system, latent sample data from the scene latent data. The computer-implemented method can include providing, by the computing system, the latent sample data to a decoder model, the decoder model configured to decode the latent sample data into a motion forecast including one or more predicted trajectories of the one or more actor features. The computer-implemented method can include receiving, by the computing system, the motion forecast including one or more predicted trajectories of the one or more actor features from the decoder model.

Another example aspect of the present disclosure is directed to a computer-implemented method of training a motion forecasting system. The computer-implemented method can include obtaining, by a computing system including one or more computing devices, a training dataset including one or more training examples labeled with ground truth data, the one or more training examples including one or more actor features and the ground truth data including a ground truth context of the one or more actor features. The computer-implemented method can include providing, by the computing system, the one or more training examples labeled with ground truth data to a latent encoder model, the latent encoder model configured to produce a first latent distribution in response to receipt of the one or more training examples and the ground truth data. The computer-implemented method can include providing, by the computing system, the one or more training examples to a latent prior model, the latent prior model configured to produce a second latent distribution in response to receipt of the one or more training examples. The computer-implemented method can include determining, by the computing system, a training loss based at least in part on the first latent distribution and the second latent distribution. The computer-implemented method can include backpropagating, by the computing system, the training loss through at least the latent prior model to train at least the latent prior model.

Another example aspect of the present disclosure is directed to a computer-implemented method of operating an autonomous vehicle. The computer-implemented method can include obtaining, by the computing system, one or more scene observations. The computer-implemented method can include providing, by the computing system, the one or more scene observations to a feature extraction model, the feature extraction model configured to produce scene data including one or more actor features from the one or more scene observations. The computer-implemented method can include receiving, by the computing system, the scene data including one or more actor features from the feature extraction model. The computer-implemented method can include providing, by the computing system, the scene data to a latent prior model, the latent prior model configured to generate scene latent data in response to receipt of scene data, the scene latent data including one or more latent variables. The computer-implemented method can include obtaining, by the computing system, the scene latent data from the latent prior model. The computer-implemented method can include sampling, by the computing system, one or more latent samples from the scene latent data. The computer-implemented method can include providing, by the computing system, the one or more latent samples to a decoder model, the decoder model configured to decode the latent samples into a motion forecast including one or more predicted trajectories of the one or more actor features. The computer-implemented method can include obtaining, by the computing system, one or more motion forecasts including one or more predicted trajectories of the one or more actor features from the decoder model. The computer-implemented method can include providing, by the computing system, the one or more predicted trajectories to a motion planning model configured to generate a motion plan for an autonomous vehicle based at least in part on the one or more predicted trajectories. The computer-implemented method can include implementing, by the computing system, the motion plan to control the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
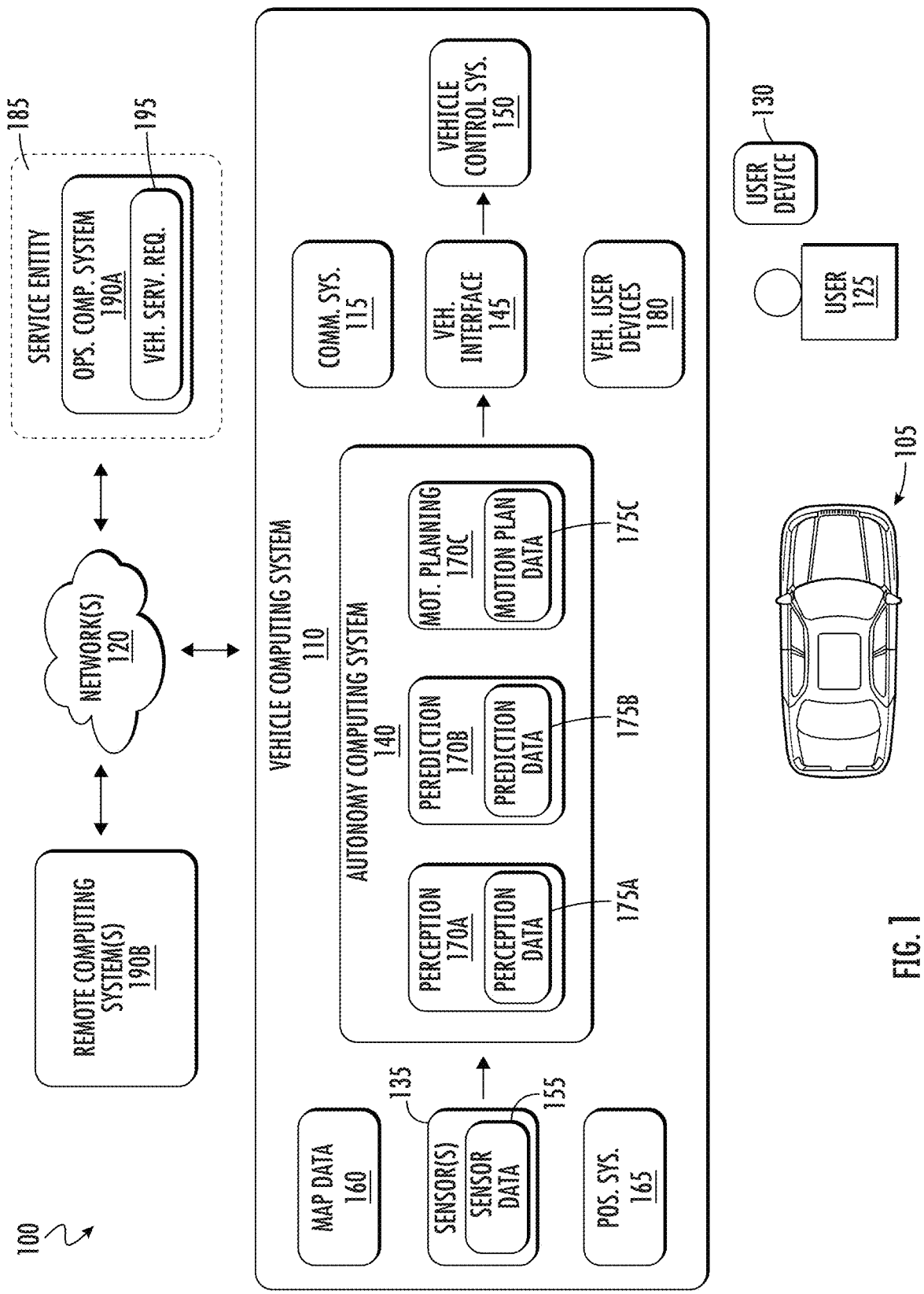
FIG. 1 depicts a block diagram of an example system for controlling and communicating with a vehicle according to example aspects of the present disclosure.

Example aspects of the present disclosure are generally directed to systems and methods for latent distribution modeling for scene-consistent motion forecasting. The systems and methods described herein can model interaction between traffic participants, or actors, to provide scene-consistent motion forecasts of a scene. The motion forecasts can be used in motion planning for controlling an autonomous vehicle. In particular, the systems and methods described herein can characterize joint distributions over future trajectories of one or more traffic participants in a scene by learning a distributed latent representation of the scene. Systems and methods according to example aspects of the present disclosure can model interaction in a scene latent distribution that captures some or all sources of uncertainty. Additionally, systems and methods according to example aspects of the present disclosure can use a deterministic decoder to characterize an implicit joint distribution over actors' future trajectories without any independence assumptions at the output level. This can provide efficient parallel sampling, high expressivity and/or trajectory samples that are substantially more consistent across actors. Samples of the latent representation provided to a deterministic decoder can produce trajectory samples that are consistent across traffic participants and achieve improved interaction understanding. An actor's trajectory can include waypoints over time in the coordinate frame defined by the actor's current position and heading. Thus, systems and methods according to example aspects of the present disclosure can provide for motion plans having improved user comfort and/or safety.

Autonomous vehicles or self-driving vehicles can autonomously transport people and/or goods, providing a safer and/or more efficient solution to transportation. One critical component for autonomous driving is the ability to perceive the world and forecast possible future instantiations of the scene. Producing multi-modal motion forecasts that precisely capture multiple plausible futures consistently for many actors in the scene can present challenges, due at least to the complexity presented by interactions between actors. This complexity can be significant. For instance, the future can be uncertain as actor behaviors may be influenced not only by their own individual goals and intentions but also by the other actors' actions. For instance, an actor at an intersection may choose to turn right or go straight due to its own destination, and yield or go if the behavior of a nearby traffic participant is aggressive or conservative. Moreover, unobserved traffic rules such as the future traffic light states may heavily affect the traffic. Some or all of this information may not be directly observable and thus can require complex reasoning about the scene as a whole, including, for example, its geometry, topology and the interaction between multiple actors.

In a motion planning system, detections and motion forecasts for other actors in the scene may be passed as obstacles to a motion-planner in order to plan a safe maneuver. The distribution over future trajectories may desirably cover the ground-truth for the plan to be safe, but also may desirably exhibit low enough entropy such that a comfortable ride with reasonable progress is achieved. Thus in complex urban environments, an autonomous vehicle can desirably reason about multiple futures separately and plan proactively by understanding how its own actions might influence other actors' behaviors. In addition, in (e.g., closed-loop) self-driving simulators, smart-actor models may be responsible for generating stochastic joint behaviors that are realistic at a scene-level, with actors obeying to underlying scene dynamics with complex interactions.

Thus, it can be desirable to learn a joint distribution over actors' future trajectories that characterizes how the scene might unroll as a whole. A joint distribution over actors' future trajectories can provide for samples that are socially consistent across an entire scene, which can provide a motion planner system with improved reasoning about possible future scenarios separately. This can also provide for realistic simulation of complex traffic scenes. However, this may be intractable for some existing systems and methods, especially for complex scenes. To solve this problem, some existing motion forecasting approaches assume marginal independence across actors' future trajectories. This can cause systems to fail to achieve scene-consistent futures. Alternatively, auto-regressive formulations model interactions at the output level, but require sequential sampling which can result in slow inference and compounding errors.

Various factorizations of the joint distribution over actors' trajectories of independence assumptions have been proposed to sidestep the intractability of true conditional dependence. One simple approximation is to assume independent futures across actors and time steps. Some approaches directly regress the parameters of a mixture of Gaussians over time, which provides efficient sampling but can suffer from low expressivity and unstable optimization. Nonparametric approaches have also been proposed to characterize the multi-modality of one actor's individual behavior. For instance, some approaches score trajectory samples from a finite set with limited coverage. Some other approaches predict an occupancy grid at different future horizons, which can be very memory consuming. Some other approaches propose to learn a one-step policy that predicts the next waypoint based on the previous history, avoiding the time independence assumption. Variational methods have also been proposed to learn an actor independent latent distribution to capture unobserved actor dynamics such as goals. However, none of these existing methods can accurately characterize the joint distribution in interactive situations, since the generative process is independent per actor.

Another existing approach to characterize the behavior of multiple actors jointly is autoregressive generation with social mechanisms, which predict the distribution over the next trajectory waypoint of each actor conditioned on the previous states of all actors. Autoregressive approaches, however, can suffer from compounding errors. For instance, during training, the model is fed the ground-truth while during inference, the model must rely on approximate samples from the learned distribution. The objective function underlying this method pushes the conditional distributions to model the marginal distributions instead. Moreover, these methods require sequential sampling, which may not be amenable to some real-time applications such as self-driving. Furthermore, capturing uncertainty and multi-modality at the actor level may not guarantee that if samples are taken from each of the actors independently, the samples will be consistent with each other.

For instance, consider an example where two actors approach an intersection. Assuming they have similar speed, then an independent output for each actor may be similar. These marginals could be accurate characterizations of the world when using a simple model, since the two prominent modes at the scene-level is that one actor yields and the other one goes, or the other way around. However, this model may fail to provide scene consistent samples. Since the output distributions for each actor are independent, when a sample is obtained from each of them, the samples may describe inconsistent futures, such as a future where both actors go, resulting in a collision.

Systems and methods according to example aspects of the present disclosure can provide solutions to these and other challenges. For instance, systems and methods according to example aspects of the present disclosure can characterize a joint distribution over motion forecasts via an implicit latent variable model (ILVM). The implicit latent variable model can model a latent distribution that can summarize unobserved scene dynamics given input sensor data and/or scene features. This can be challenging given that modern roads may present very complex geometries and topologies that can make every intersection unique. Furthermore, this can be challenging given that the dynamic environment of the scene may be only partially observed through sensor returns. Finally, challenges can be encountered as the number of actors in a scene is variable.

To address these and/or other challenges, systems and methods according to example aspects of the present disclosure can model a scene as an interaction graph including one or more nodes. For instance, the nodes can correspond to traffic participants or actors (e.g., actor features). This interaction graph can be used to produce a scene latent distribution of one or more latent variables. The scene latent distribution can be partitioned into a distributed representation among actors. For instance, scene interaction modules including, for example, graph neural networks (GNN) can be used to encode the full scene into the scene latent distribution and/or to decode latent samples from the scene latent distribution into socially consistent future trajectories. For instance, a deterministic decoder can frame the decoding of all actors' trajectories as a deterministic mapping from the inputs and scene latent samples. This can provide that the latent variables capture all the stochasticity in the generative process. This can also provide for efficient multi-sample inference via parallel sampling.

For instance, example aspects of the present disclosure are directed to a computer-implemented method for determining scene-consistent motion forecasts from sensor data. The computer-implemented method can be implemented by any suitable computing system, such as an autonomous vehicle navigation system.

The computer-implemented method can include obtaining (e.g., by a computing system including one or more computing devices) scene data including one or more actor features. In some implementations, the scene data can be extracted or otherwise obtained from one or more scene observations. For instance, the method can include obtaining (e.g., by the computing system) one or more scene observations. The scene observations can be or can include data descriptive of sensor observations from one or more sensors configured to observe the scene, such as, for example, one or more sensors mounted on an autonomous vehicle. The sensors can be any suitable sensors, such as, for example, cameras, LIDAR sensors, etc. As one example, in some implementations, the scene observations can be and/or can include a three-dimensional (3D) LIDAR point cloud. In some implementations, the LIDAR data can be voxelized. In some implementations, the scene observations can be oriented in a "Birds-Eye View" (BEV) or top-down representation.

In some implementations, the scene observations can additionally include map data, such as data descriptive of properties of roads, crosswalks, signage, intersections, railroads, buildings, and/or other terrain features of the scene. In some implementations, the map data can be rasterized. The map data can encode traffic elements such as intersections, lanes, roads, and traffic lights. In some implementations, elements with different semantics are encoded into different channels in the raster. Map elements that are rasterized can be or can include, for example, drivable surface polygons, road polygons, intersection polygons, straight vehicle lane polygons, dedicated left and right vehicle lane polygons, dedicated bike lane polygons, dedicated bus lane polygons, centerline markers for all lanes, lane dividers for all lanes with semantics (e.g., allowed to cross, not allowed to cross, might be allowed to cross.

In some implementations, the height dimension of the sensor observations can be normalized with dense groundheight information provided by map data. In some implementations, multiple LiDAR sweeps can be used to exploit motion cues by compensating the ego-motion, such as by projecting the past sweeps to the coordinate frame of the current sweep). Furthermore, in some implementations, the height and time dimension is raveled into the channel dimension, to provide for the use of 2D convolution to process spatial and/or temporal information efficiently. The final representation may thus be a 3D occupancy tensor.

The method can further include providing (e.g., by the computing system) the one or more scene observations to a feature extraction model. The feature extraction model can include one or more neural networks configured to produce scene data including one or more actor features from the one or more scene observations. For instance, in some cases, the features can be extracted from raw sensor data and HD maps in a differentiable manner, such that perception and motion forecasting can be trained jointly end-to-end. In some implementations, the feature extraction model can be or can include a backbone network. For instance, the backbone network can be a lightweight backbone network adapted for feature extraction. In some implementations, two separate streams can be instantiated such that the voxelized LiDAR and rasterized map are processed separately. The resulting features from both streams can then be concatenated feature-wise (e.g., if they share the same spatial resolution) and fused by a convolutional header. These extracted features can inform both the downstream detection and motion forecasting networks. The method can then include receiving (e.g., by the computing system) the scene data including one or more actor features from the feature extraction model.

In some implementations, the feature extraction model can include a scene feature extraction model and/or an actor feature recognition model. For instance, the method can include providing (e.g., by the computing system) the one or more scene observations to a scene feature extraction model. The scene feature extraction model can include one or more neural networks configured to extract one or more scene features from the one or more scene observations. The method can then include receiving (e.g., by the computing system) the one or more scene features from the scene feature extraction model. The scene features may be features that may not each correspond to an actor in the scene, such as a global feature map. For instance, a CNN-based perception backbone network architecture can be used to extract rich geometrical and motion features about the whole scene from a past history of voxelized LiDAR point clouds and/or a raster map.

The method can then include providing (e.g., by the computing system) the one or more scene features to an actor feature recognition model. The actor feature recognition model can parse the scene features into actor features that correspond to an actor. For instance, the one or more actor features can include data descriptive of an actor context of one or more traffic participants. For instance, the actor feature recognition model can be configured to extract spatial feature maps for bounding boxes from the one or more scene features by rotated region of interest (ROI) align. Rotated ROI align can be applied to extract (e.g., fixed size) spatial feature maps for bounding boxes with arbitrary shapes and rotations from the scene features (e.g., the global feature map extracted by the backbone). For instance, rotated ROI align can provide actor contexts for each actor.

Additionally and/or alternatively, the actor feature recognition model can be configured to pool a region around each spatial feature map to produce pooled actor features. For instance, a region around each actor in its frame can be pooled, such as with an axis defined by the actor's centroid orientation. The pooled actor features may be larger than the eventual actor features.

Additionally and/or alternatively, the actor feature recognition model can be configured to downsample the pooled actor features by applying one or more downsampling convolutional neural networks. As one example, a 4-layer down-sampling convolutional network can be applied.

Additionally and/or alternatively, the actor feature recognition model can be configured to max-pool along spatial dimensions to reduce each pooled actor feature to a respective actor feature of the one or more actor features. For instance, after the downsampling CNN is applied, it can be followed by max-pooling along the spatial dimensions to reduce the feature map to a desired dimensional feature vector per actor. One example convolutional network uses a dilation factor of 2 for the convolutional layers to enlarge the receptive field for the per-actor features, which can improve performance. The method can then include receiving (e.g., by the computing system) the one or more actor features from the actor feature recognition model.

For instance, in some implementations, the (e.g., scene) feature extraction model (e.g., the backbone model) includes two convolutional layers to output a classification or confidence score and/or a bounding box for each anchor location (e.g., each scene feature). These features are eventually reduced to the final set of candidates by applying non-maximal suppression (NMS) and finally thresholding low probability detections (given by the desired common recall). In some implementations, a backbone network along with features for object detection and per actor feature extraction are provided. The proposed mixture of trajectories output parameterization, where each way-point is a gaussian, is then used. In some cases, these baselines may not obtain temporally consistent samples, since the gaussians are independent across time (e.g., the models are not auto-regressive). To solve this, a heuristic sampler can be used to obtain temporally consistent samples from this model. The sampled trajectories are extracted using the re-parameterization technique for a bi-variate normal, where the model predicts a normal distribution per waypoint.

In some cases, the noise can be constant across time for a given sample and actor. Intuitively, having a constant noise across time steps can provide sampled waypoints whose relative location with respect to its predicted mean and covariance is constant across time (e.g., translated by the predicted mean and scaled by the predicted covariance per time). In some cases, to address the compounding error problem found in some auto-regressive models, adjustments can be made to the training procedure to account for the noise in the conditioning space. To help simulate the noise it sees during inference, gaussian noise can be added to the conditioning state. The amount of noise expected between time-steps can be tuned.

In some implementations, an object detection module can be responsible for recognizing other traffic participants in a scene, followed by a motion forecasting module that predicts how the scene might unroll given the current state or actor state of each actor. The actor state may be a compact representation of an actor, including qualities such as pose, velocity, and acceleration. This can be beneficial in some cases; however, it can be difficult to incorporate uncertainty due to sensor noise or occlusion. In some implementations, these two tasks can be combined by having a single model (e.g., a single fully convolutional backbone network) predict both the current and future states of actors. For instance, a single fully convolutional backbone network can predict both the current state and future state(s) for each pixel (e.g., in a bird's eye view grid) directly from sensor data, such as a voxelized LiDAR point-cloud, and/or map data, such as a semantic raster of an HD map. This approach can propagate uncertainty between the two tasks in the feature space, without the need of explicit intermediate representations.

For instance, the perception and prediction tasks seek to understand where other actors are currently located and/or how they might move in the next few seconds. This can be accomplished by leveraging (e.g., 3D) sensor data such as LiDAR point clouds for dynamic object recognition and/or high-definition maps which provide information about the static part of the environment. For instance, scene features can be extracted from LiDAR and maps and subsequently fused to produce rich features. Once rich features from the whole scene are extracted, object detection can be performed to recognize actor features corresponding to actors in the scenes.

Additionally and/or alternatively, the method can include providing (e.g., by the computing system) the scene data to a latent prior model. The latent prior model can be configured to generate scene latent data in response to receipt of scene data. In some implementations, the latent prior model can be or can include a scene interaction module including one or more graph neural networks. The scene latent data can be or can include one or more latent variables. In some implementations, the scene latent data can include a latent distribution that is partitioned into one or more latent variables. For instance, in some implementations, the one or more latent variables can be respective to the one or more actor features such that each actor feature has an associated latent variable of the scene latent data that is anchored to the actor feature. In some implementations, the one or more latent variables can be or can include one or more continuous latent variables. Additionally and/or alternatively, the method can include obtaining (e.g., by the computing system) the scene latent data from the latent prior model.

For instance, the generative process of future trajectories over actors can be formulated with a latent variable model including one or more latent variables that intuitively capture unobserved scene dynamics such as actor goals and style, multi-agent interactions, or future traffic light states. This modeling intuitively encourages the latent distribution to capture stochasticity in the generative process. In some implementations, the latent distribution can be a continuous latent distribution including one or more continuous latent variables for high expressivity.

Producing a latent distribution that can capture all the uncertainties in any scenario can present challenges, as scenarios can vary drastically in the number of actors, the road topology, and/or traffic rules. This challenge can be mitigated by partitioning the scene latent distribution and obtaining a distributed representation where each latent variable in the scene latent distribution is anchored to a respective actor, such as anchored to a particular node in an interaction graph with traffic participants as nodes. The distributed representation may provide the benefit of naturally scaling the capacity of the latent distribution as the number of actors grows. Furthermore, the anchoring may give the model an inductive bias that eases the learning of a scene latent distribution. Intuitively, each anchored latent variable encodes unobserved dynamics most relevant to its respective actor, including interactions with neighboring actors and traffic rules that apply in its locality. For instance, each latent variable can be represented as a diagonal multivariate Gaussian. Each latent variable can be conditioned on all actors such that the latent distribution is not marginally independent across actors, although factorized. For instance, despite anchoring each partition of the scene latent to an actor, each individual latent variable can contain information about the full scene, since each final node representation is dependent on the entire input because of the message propagation in the fully-connected interaction graph.

Additionally and/or alternatively, the method can include sampling (e.g., by the computing system) latent sample data from the scene latent data. For instance, the scene latent data (e.g., the one or more latent variables) can define a latent (e.g., a latent distribution) that can be sampled to produce latent samples of the scene latent data. The latent sample data can define a possible future for the actors (e.g., the actor features).

Additionally and/or alternatively, the method can include providing (e.g., by the computing system) the latent sample data to a decoder model. The decoder model can be configured to decode the latent sample data into a motion forecast including one or more predicted trajectories of the one or more actor features. For instance, the decoder model can produce a motion forecast from latent samples. Additionally and/or alternatively, the method can include receiving (e.g., by the computing system) the motion forecast including one or more predicted trajectories of the one or more actor features from the decoder model.

In some implementations, the decoder model can be or can include a deterministic decoder model. For instance, the decoder can be or can include a deterministic mapping to implicitly characterize the joint probability, such as opposed to explicitly representing it in a parametric form. This approach can provide for evaluation without factorizing the joint distribution and thus can sidestep the associated challenges. In particular, the deterministic decoder can be highly beneficial for generating socially consistent trajectories. In this framework, generating scene-consistent future trajectories across actors is simple and highly efficient, as it may be performed with only one stage of parallel sampling.

In some implementations, the decoder model can be or can include a scene interaction module including one or more graph neural networks. For instance, the decoder including a scene interaction module can predict a realization of the future at the scene level via message parsing. As an example, each actor trajectory can be established with respect to samples from each latent variable of the scene latent data and/or each actor feature. This can provide for improved reasoning about multi-agent interactions such as car following, yielding, etc. For instance, each actor context can be initialized as a node in the decoder SIM. After a round of message parsing, each node can then contain an updated representation of a respective actor that takes into account the underlying dynamics of the scene summarized in the latent distribution. Finally, the trajectory sample for the actor can be deterministically decoded, such as by the output function of the SIM. For instance, the output function can be the deterministic mapping. This can be performed without requiring any additional sampling steps. The trajectory-level scene sample can thus be a collection of all actor trajectories.

In some implementations, the decoder model can be or can include a specified and tractable conditional likelihood. In this implementation, many tools are available for inference and learning. As one example, variational inference, such as the variational auto-encoder (VAE), can be used.

In some implementations, the decoder can be characterized via a stochastic sampling procedure where a conditional dependence is not specified. In this case, likelihood-free inference methods can be required for learning. As examples, density estimation by comparison using either density ratio (GAN) or density difference (MMD). These methods, however, may be more difficult to optimize.

In some implementations the prior model, the encoder model, and/or the decoder model can include a scene interaction model. The scene interaction model can be configured to model the latent distribution as an interaction graph including one or more nodes representative of the one or more actor features and one or more edges representative of interactions between the one or more actor features. For instance, in some implementations, the scene interaction model can include one or more graph neural networks. In some implementations, a message function of the one or more graph neural networks can include a multi-layer perceptron model that takes as input one or more terminal nodes of the one or more nodes at a previous propagation step of the one or more graph neural networks. For instance, the edge or message function of the graph neural network(s) in the scene interaction module can include, for example, a 3-layer MLP (multi-layer perceptron) that takes as input the hidden states of the two terminal nodes at each edge in the graph at the previous propagation step. Additionally and/or alternatively, the input can include the projected coordinates of their corresponding bounding boxes. In some implementations, an aggregation function of the one or more graph neural networks includes a feature-wise max-pooling aggregation function. In some implementations, a gated recurrent unit cell is configured to update a state (e.g., hidden state) of the one or more nodes. In some implementations, the scene interaction module can include an output network that outputs the results from the graph propagations, such as a 2-layer MLP.

The scene interaction module can model the latent distribution as an interaction graph, which can provide improved understanding of spatial information. This spatial information can be beneficial in jointly forecasting future trajectories of each actor. For instance, the node state of each node can be initialized with a set of actor features and known spatial information. The spatial information can include information such as relative coordinates of the actors relative to their peers or neighbors. In some cases, during object detection and local feature extraction around each actor, however, it may not be possible to include some necessary global information due to the limited receptive field and/or the translation invariance of convolutional neural networks. To remedy this, the node states can be initialized as the concatenation of the deep local features and the spatial information of each actor or node in the graph, such as its location, heading and/or its dimensions (e.g., in Bird's Eye View). A learned double edge function can propagate messages around the nodes in the graph. Given these messages, each actor can aggregate the messages (e.g., via max pooling) to update a respective node state. In some implementations, the scene interaction model can perform a single round of message passing to update the nodes' representation, taking into account spatiotemporal relationships. The scene interaction module in the prior, encoder and/or decoder can capture scene-level understanding that is not present with independence assumptions at the latent or output level.

The systems and methods described herein can provide for efficiently sampling multiple possible futures from the latent distribution of the scene latent distribution. For instance, in some implementations, the method can include sampling (e.g., by the computing system) second latent sample data from the scene latent data. The second latent sample data can be descriptive of a differing possible future from the latent sample data. Additionally and/or alternatively, the method can include providing (e.g., by the computing system) the second latent sample data to the decoder model and receiving (e.g., by the computing system) a second motion forecast including one or more second predicted trajectories of the one or more actor features from the decoder model. The second predicted trajectories can differ from the predicted trajectories of other samples.

For instance, a first sample from the scene latent distribution provided to the decoder can produce one possible realization of the future trajectories. A second sample can result in a distinct future. The sampling process is illustrated sequentially for the purposes of illustration, parallel sampling and/or decoding can be employed in accordance with example aspects of the present disclosure. For instance, the samples may be independent, as the stochasticity in the system is present in the latent distribution (e.g., as opposed to the decoder).

In other implementations, example aspects of the present disclosure are directed to a computer-implemented method of training a motion forecasting system. For instance, the method can include training an implicit latent variable model according to example aspects of the present disclosure. In some implementations, the model can be fully differentiable and can be trained end-to-end through backpropagation using a multi-task objective.

The method can include obtaining (e.g., by a computing system including one or more computing devices) a training dataset including one or more training examples labeled with ground truth data. For instance, the one or more training examples can include one or more actor features. Additionally and/or alternatively, the ground truth data can include a ground truth context of the one or more actor features. The ground truth context can be descriptive of a known context of the actor features, such as a known position, pose, velocity, etc.

The method can include providing (e.g., by the computing system) the one or more training examples labeled with ground truth data to a latent encoder model. The latent encoder model can be configured to produce a first latent distribution in response to receipt of the one or more training examples and the ground truth data. For instance, in some cases, integration over the scene latent distribution is intractable, in which case amortized variational inference can be used. For instance, by introducing an encoder distribution to approximate the true posterior, the learning problem can be reformulated as a maximization of the Evidence Lower BOund (ELBO). In some implementations, the latent encoder model can include a scene interaction module. For instance, after running one round of message passing, the scene interaction module can predict the distribution over latent variables.

The encoder model can approximate the true posterior latent distribution. This model may also be called a recognition network. Because the encoder model receives the ground truth data (e.g., the target output) as an input, it can recognize scene dynamics that are unobserved by the latent prior model. In this manner, the encoder may only be used during training, since it requires access to the ground-truth future trajectories. For instance, the encoder may be omitted from deployed models and/or included at an online training system.

The method can include providing (e.g., by the computing system) the one or more training examples to a latent prior model. The latent prior model can be configured to produce a second latent distribution in response to receipt of the one or more training examples. For instance, the latent prior model can be agnostic to the ground truth data such that the latent prior model is usable during inference (e.g., when ground truth data is unavailable).

The method can include determining (e.g., by the computing system) a training loss based at least in part on the first latent distribution and the second latent distribution. The training loss can be or can include various losses from components of the model. For instance, in some implementations, the training loss can be or can include a KL divergence loss between the first latent distribution and the second latent distribution.

Additionally and/or alternatively, in some implementations, the training loss can include a feature loss. The feature loss can be a loss in recognized features and/or actors. For instance, the feature loss can be determined by providing (e.g., by the computing system) training scene observations to a feature extraction model. The feature extraction model can be or can include a scene feature extraction model and/or an actor feature recognition model. Determining the feature loss can further include receiving (e.g., by the computing system) one or more predicted features from the feature extraction model. Determining the feature loss can further include determining (e.g., by the computing system) a feature loss between the one or more predicted features and the ground truth data. The feature loss can include a cross-entropy loss between the one or more predicted features and one or more training features of the ground truth data. Additionally and/or alternatively, the feature loss can include a regression loss between bounding boxes of the one or more predicted features and bounding boxes of the ground truth data. For instance, in some implementations, the feature loss includes a cross entropy loss applied to detection scores of the predicted features and/or a smooth L1 applied to the bounding box regression targets of the one or more predicted features. The method can include backpropagating (e.g., by the computing system) the training loss through at least the latent prior model to train at least the latent prior model. For instance, the training loss can be backpropagated through some or all trainable portions of the implicit latent variable model, such as an object detection or feature extraction model, latent prior model, decoder model, encoder model, etc.

In some implementations, the training loss can include a reconstruction loss. For instance, the reconstruction loss can be obtained by sampling (e.g., by the computing system) the first latent distribution to produce one or more first latent samples. The first latent distribution can include first sample data, such as a first set of samples from the latent distribution. Determining the reconstruction loss can further include sampling (e.g., by the computing system) the second latent distribution to produce one or more second latent samples. Determining the reconstruction loss can further include providing (e.g., by the computing system) the one or more first latent samples to a decoder model and receiving (e.g., by the computing system) one or more first predicted trajectories from the decoder model. The first predicted trajectories can be representative of a first possible future of the actor features. Determining the reconstruction loss can further include providing (e.g., by the computing system) the one or more second latent samples to the decoder model and receiving (e.g., by the computing system) one or more second predicted trajectories from the decoder model. The second predicted trajectories can be representative of a second possible future of the actor features that desirably matches the first possible future. Determining the reconstruction loss can include determining (e.g., by the computing system) a reconstruction loss based at least in part on the one or more first predicted trajectories and the one or more second predicted trajectories. For instance, the reconstruction loss can be based at least in part on a difference between the one or more first predicted trajectories and the one or more second predicted trajectories. In some implementations, the reconstruction loss can include a Huber loss.

The motion forecasts produced as described according to example aspects of the present disclosure can be useful for motion planning and/or operating an autonomous vehicle. For instance, example aspects of the present disclosure are directed to a computer-implemented method of operating an autonomous vehicle. The systems and methods described herein can be used to generate a motion plan for safely navigating an autonomous vehicle.

The method can include obtaining one or more predicted trajectories of one or more actors. For instance, the one or more predicted trajectories can be obtained from an implicit latent variable model according to example aspects of the present disclosure.

Additionally and/or alternatively, the method can include providing (e.g., by the computing system) the one or more predicted trajectories to a motion planning model configured to generate a motion plan for an autonomous vehicle based at least in part on the one or more predicted trajectories. For instance, the motion planning model can generate a motion plan that safely navigates the scene in view of the predicted trajectories of the actors in the scene.

Additionally and/or alternatively, the method can include implementing (e.g., by the computing system) the motion plan to control the autonomous vehicle. For instance, one or more control devices (e.g., throttle, brakes, steering, etc.) can be controlled based at least in part on the motion plan to implement the motion plan and thus navigate the autonomous vehicle.

Systems and methods according to example aspects of the present disclosure can achieve a number of technical effects and benefits, including but not limited to improvements to computing technologies. For instance, systems and methods (e.g., including an implicit latent variable model) can achieve improved generation of scene-consistent samples while producing less entropic joint distributions that also better cover the ground-truth. Moreover, when using the scene-consistent motion forecasts, a motion planner (e.g., including a conventional motion planner) can plan safer and more comfortable trajectories.

Referring now to the FIGS., example aspects of the present disclosure will be discussed in more detail. FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 110 can be located onboard the vehicle 105 (e.g., it can be included on and/or within the vehicle 105).

The vehicle 105 incorporating the vehicle computing system 110 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a light weight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send and/or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g., intranet), wide area network (e.g., Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155 (e.g., one or more sensor observations). The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 140 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via difference sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170A, using a perception system, etc.) can process the sensor data 155, the map data 160, etc. to obtain perception data 175A. The vehicle computing system 110 can generate perception data 175A that is indicative of one or more states or contexts (e.g., current and/or past state(s)) of one or more objects (e.g., actors) that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, an implicit latent variable model as described herein that is trained to identify object(s) within the surrounding environment of the vehicle 105 and the state data associated therewith. The perception data 175A can be utilized for the prediction function 170B of the autonomy computing system 140. In some implementations, the perception function 170A and prediction function 170B may be combined as a joint perception and prediction task that simultaneously identifies and predicts trajectories of one or more actors.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction function 170B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, an ILVM according to example aspects of the present disclosure that is trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning function 170C can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning function 170C can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, traveling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 195 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The vehicle service request 195 can indicate a type/size/class of vehicle such as, for example, a sedan, an SUV, luxury vehicle, standard vehicle, etc. The vehicle service request 195 can indicate a product of the service entity 185. For example, the vehicle service request 195 can indicate that the user is requesting a transportation pool product by which the user would potentially share the vehicle (and costs) with other users/items. In some implementations, the vehicle service request 195 can explicitly request for the vehicle service to be provided by an autonomous vehicle or a human-driven vehicle. In some implementations, the vehicle service request 195 can indicate a number of users that will be riding in the vehicle/utilizing the vehicle service. In some implementations, the vehicle service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 125. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determine which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2:
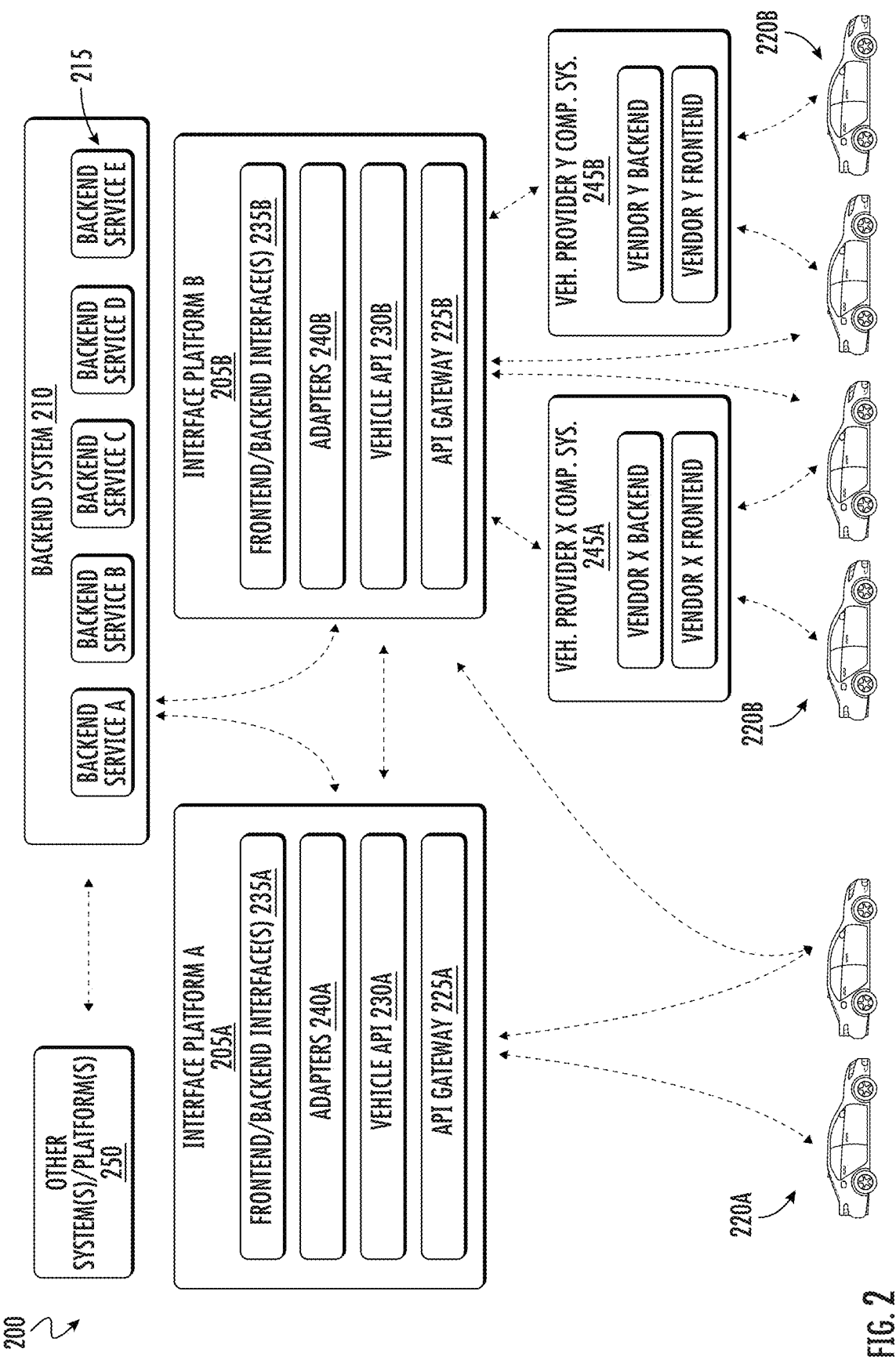
FIG. 2 depicts an example service infrastructure according to example aspects of the present disclosure.

FIG. 2 depicts an example service infrastructure 200 according to example embodiments of the present disclosure. The service infrastructure 200 can include one or more systems, interfaces, and/or other components that can be included in an operations computing systems of the service entity for coordinating vehicle services and managing/supporting the autonomous vehicle associated therewith. The service infrastructure 200 can represent, for example, the architecture of a service platform of the operations computing system for coordinating and providing one or more vehicle services (e.g., via autonomous vehicle(s), etc.).

The service infrastructure 200 of an operations computing system can include a first application programming interface platform 205A, a second application programming interface platform 205B, and/or a backend system 210 with one or a plurality of backend services 215. These components can allow the service infrastructure 200 (e.g., the operations computing system) to communicate with one or more autonomous vehicles and/or one or more other systems.

The first application programming interface platform 205A can facilitate communication with one or more autonomous vehicles of the service entity. For example, as described herein, the service entity may own, lease, etc. a fleet of autonomous vehicles 220A that can be managed by the service entity (e.g., its backend services) to provide one or more vehicle services. The autonomous vehicle(s) 220A can be utilized by the service entity to provide the vehicle service(s) and can be included in the fleet of the service entity. Such autonomous vehicle(s) may be referred to as "service entity autonomous vehicles" or "first party autonomous vehicles."

The first application programming interface platform 205A can include a number of components to help facilitate the support, coordination, and management of the first party autonomous vehicles 220A associated with the service entity. The first application programming interface platform 205A (e.g., a private platform, etc.) can provide access to one or more backend services 215 that are available to the first party autonomous vehicles 220A. To help do so, the first application programming interface platform 205A can include a first API gateway 225A. The first API gateway 225A can function as a proxy for application programming interface (API) calls and can help to return an associated response. The first API gateway 225A can help provide other support functions for the service infrastructure 200 such as, for example, authentication functions, etc.

The first application programming interface platform 205A can include one or more APIs such as, for example, a first vehicle API 230A. The first vehicle API 230A can include a library and/or parameters for facilitating communications between the first party autonomous vehicles 220A and the backend service(s) 215 of the backend system 210. For example, the first vehicle API 230A can be called by a first party autonomous vehicle 220A and/or another system (e.g., system(s)/platform(s) 250) to help communicate data, messages, etc. to and/or from an autonomous vehicle and/or another system (e.g., system(s)/platform(s) 250). The first vehicle API 230A can provide for communicating such information in a secure, bidirectional manner that allows for expanded processing of data offboard a vehicle, analyzing such data in real time, and/or the like.

The first application programming interface platform 205A can include first frontend/backend interface(s) 235A. Each first frontend/backend interface 235A can be associated with a backend service 215 of the backend system 210. The first frontend/backend interface(s) 235A can serve as interface(s) for one client (e.g., an external client such as a first party autonomous vehicle 220A) to provide data to another client (e.g., a backend service 215). In this way, the frontend/backend interface(s) 235A can be external facing edge(s) of the first application programing interface platform 205A that are responsible for providing secure tunnel(s) for first party autonomous vehicles 220A (and/or other system(s)/platform(s) 250) to communicate with the backend system 215 (and vice versa) so that a particular backend service can be accessed by a particular first party autonomous vehicle 220A (and/or other system(s)/platform(s) 250).

In some implementations, the first application programing interface platform 205A can include one or more first adapters 240A, for example, to provide compatibility between one or more first frontend/backend interfaces 235A and one or more of the API(s) associated with the first application programming interface platform 205A (e.g., vehicle API 230A). The first adapter(s) 240A can provide upstream and/or downstream separation between particular infrastructure components, provide or assist with data curation, flow normalization and/or consolidation, etc.

The second application programming interface platform 205B (e.g., a public platform, etc.) can facilitate communication with one or more autonomous vehicles of a third party vehicle provider. As described herein, a third party vehicle provider can be an entity that makes one or more of its autonomous vehicles available to the service entity for the provision of vehicle services. This can include, for example, an individual, an original equipment manufacturer (OEM), a third party vendor, or another entity that places its autonomous vehicle(s) online with the service platform of the service entity such that the autonomous vehicle(s) can provide vehicle services of the service entity. These autonomous vehicles may be referred to as "third party autonomous vehicles" and are shown in FIG. 2 as third party autonomous vehicles 220B. Even though such autonomous vehicles may not be included in the fleet of autonomous vehicles of the service entity, the service infrastructure 200 (e.g., of the service entity's service platform, etc.) can allow the third party autonomous vehicles 220B to provide vehicle services offered by the service entity, access the one or more backend services 215 of the backend system 210, etc.

The second application programming interface platform 205B can allow the service platform to communicate directly or indirectly with autonomous vehicle(s). In some implementations, a third party autonomous vehicle 220B may call an API of, send data/message(s) to, receive data/message(s) from/directly through, etc. the second application programming interface platform 205B.

Additionally, or alternatively, another computing system can serve as an intermediary between the third party autonomous vehicles 220B and the second application programming interface platform 205B (and the service platform associated therewith). For example, the service infrastructure 200 can be associated with and/or in communication with one or more third party vehicle provider computing systems, such as a vehicle provider X computing system 245A and a vehicle provider Y computing system 245B. Each third party vehicle provider X, Y can have its own, separate third party autonomous fleet including respective third party autonomous vehicles 220B. The third party vehicle provider computing systems 245A, 245B can be distinct and remote from the service infrastructure 200 and provide for management of vehicles associated with that particular third party vehicle provider. As shown in FIG. 2, a third party vehicle provider computing system 245A, 245B can include its own backends and/or frontends for communicating with other systems (e.g., third party autonomous vehicle(s) 220B, operations computing system, etc.).

The third party computing system 245A, 245B associated with a particular third party autonomous vehicle fleet can serve as the communication intermediary for that fleet. For example, third party autonomous vehicles 220B associated with third party vehicle provider X can communicate with the third party vehicle provider X computing system 245A which can then communicate with the service infrastructure 200 (e.g., to access the available backend services 215) via the second application programming interface platform 205B. Data from the service infrastructure 200 (e.g., the backend services 215) can be communicated to the vehicle provider X computing system 245A (e.g., via the second application programming interface platform 235B) and then to the third party autonomous vehicles 220B associated with third party vehicle provider X. In another example, third party autonomous vehicles 220B associated with third party vehicle provider Y can communicate with the third party vehicle provider Y computing system 245B which can then communicate with the service infrastructure 200 (e.g., to access the available backend services 215) via the second application programming interface platform 205B. Data from the service infrastructure 200 (e.g., the backend services 215) can be communicated to the third party vehicle provider Y computing system 245B (e.g., via the second application programming interface platform 205B) and then to the third party autonomous vehicles 220B associated with third party vehicle provider Y.

The second application programming interface platform 205B can include a number of components to help facilitate the support, coordination, and management of the third party autonomous vehicles 220B associated with the third party vehicle providers. The second application programming interface platform 205B can provide access to one or more backend services 215 that are available to the third party autonomous vehicles 220B. To help do so, the second application programming interface platform 205B can include a second API gateway 225B. The second API gateway 225B can function as a proxy for application programming interface (API) calls and can help to return an associated response. The second API gateway 225B can help provide other support functions for the service infrastructure 200 such as, for example, authentication functions, etc.

The second application programming interface platform 205B can include one or more APIs such as, for example, a second vehicle API 230B. The second vehicle API 230B can include a library and/or parameters for facilitating communications between the third party autonomous vehicles 220B and the backend service(s) 215 of the backend system 210. For example, the second vehicle API 230B can be called by a third party autonomous vehicle 220B and/or another system (e.g., a third party vehicle provider computing system 245B, etc.) to help communicate data, messages, etc. to and/or from an autonomous vehicle. The second vehicle API 230B can provide for communicating such information in a secure, bidirectional manner.

The second application programming interface platform 205B can include second frontend/backend interface(s) 235B. Each of the second frontend/backend interface(s) 235B can be associated with a backend service 215 of the backend system 210. The second frontend/backend interface(s) 235B can serve as interface(s) for one client (e.g., an external client such as a third party autonomous vehicle 220B, a third party vehicle provider computing system 245A, 245B) to provide data to another client (e.g., a backend service 215). In this way, the second frontend/backend interface(s) 235B can be external facing edge(s) of the second application programing interface platform 205B that are responsible for providing secure tunnel(s) for third party autonomous vehicles 220B (and/or other intermediary systems) to communicate with the backend system 210 (and vice versa) so that a particular backend service 215 can be utilized. In some implementations, the second application programing interface platform 205B can include one or more second adapters 240B, for example, to provide compatibility between one or more second frontend/backend interfaces 235B and one or more of the API(s) associated with the second application programming interface platform 205B (e.g., vehicle API 230B).

In some implementations, the first party autonomous vehicles 220A can utilize the second application programming interface platform 205B to access/communicate with the service platform/backend service(s) 215. This can allow for greater accessibility and/or back-up communication options for the first party autonomous vehicles 220A.

The backend system 210 can host, store, execute, etc. one or more backend services 215. The backend service(s) 215 can be implemented by system client(s), which can include hardware and/or software that is remote from the autonomous vehicles and that provide a particular service to an autonomous vehicle. The backend service(s) 215 can include a variety of services that help coordinate the provision of vehicle service(s) and support the autonomous vehicles and/or the third party vehicle providers performing/providing those vehicle service(s).

For example, the backend service(s) 215 can include a matching service that is configured to match an autonomous vehicle and/or an autonomous vehicle fleet with a service request for vehicle services. Based on a match, the matching service can generate and communicate data indicative of a candidate vehicle service assignment (indicative of the requested vehicle service) for one or more autonomous vehicles. In some implementations (e.g., for first party autonomous vehicle(s) 220A), the candidate vehicle service assignment can include a command that a first party autonomous vehicle 220A is required to accept, unless it would be unable to safely or fully perform the vehicle service. In some implementations (e.g., for third party autonomous vehicle(s) 220B), the candidate vehicle service assignment can include a request or offer for one or more autonomous vehicles to provide the vehicle service. The candidate vehicle service assignment can be communicated to one or more third party vehicle provider computing systems 245A, 245B and/or one or more autonomous vehicle(s) 220B (e.g., via the second application programing interface platform 205B) and/or one or more autonomous vehicle(s) 220A (e.g., via the first application programing interface platform 205A). The candidate vehicle service assignment can be accepted or rejected. If accepted, an autonomous vehicle 220A, 220B can be associated (e.g., assigned to service, etc.) with the vehicle service assignment. The vehicle service assignment can include data indicative of the user, a route, an origin location for the vehicle service, a destination location for the vehicle service, service parameters (e.g., time restraints, user accommodations/preferences, etc.), and/or any other information associated with a vehicle service.

The backend service(s) 215 can include an itinerary service. The itinerary service can be configured to maintain, update, track, etc. a data structure indicative of one or more task(s) and/or candidate task(s) associated with (and/or potentially associated with) a particular autonomous vehicle, autonomous vehicle fleet, and/or vehicle provider. The tasks can include, for example, vehicle service assignments for providing vehicle services and/or tasks associated with an activity other than the performance of a vehicle service. For example, the tasks can include: a testing task (e.g., for testing and validating autonomy software, hardware, etc.); a data acquisition task (e.g., acquiring sensor data associated with certain travel ways, etc.); a re-positioning task (e.g., for moving an idle vehicle between vehicle service assignments, to high demand areas, etc.); a circling task (e.g., for travelling within the current geographic area in which a vehicle is located (e.g., circle the block or neighborhood), etc.); a maintenance task (e.g., for instructing travel to a service depot to receive maintenance, etc.); a re-fueling task; a vehicle assistance task (e.g., where a vehicle travels to assist another vehicle, etc.); a deactivation task (e.g., going offline such that a vehicle, fleet of vehicles, or vehicle providers no longer accept service request, etc.); a parking task; and/or other types of tasks. The itinerary service can maintain an itinerary for an autonomous vehicle, fleet, vehicle provider, etc. The itinerary can serve as a queue for the various tasks. In some implementations, the tasks can be associated with a priority or order for which they are deployed to an autonomous vehicle, fleet, vehicle provider, etc.

In some implementations, the vehicle service assignment can be associated with a multi-modal vehicle service. For example, the user may request and/or be provided a multi-modal user itinerary by which the user is to travel to the user's ultimate destination via two or more types of transportation modalities (e.g., ground based vehicle, aerial vehicle, public transit, etc.). As such, the origin location and/or destination location identified in the vehicle service assignment may include intermediate locations (e.g., transfer points) along the user's multi-modal itinerary.

The backend service(s) 215 can include a deployment service that communicates tasks for an autonomous vehicle to complete. For example, the deployment service can communicate data indicative of a vehicle service assignment and/or another task to an autonomous vehicle (or an intermediary system). The deployment service can communicate such data to an autonomous vehicle (or an intermediary system) based at least in part on the itinerary associated therewith. By way of example, the highest priority task and/or the task that is next in order can be deployed.

The backend service(s) 215 can include a routing service. The routing service can be configured to provide an autonomous vehicle with a route for a vehicle service and/or another task. The route can be based at least in part on factors associated with the geographic area in which the autonomous vehicle is (or will be) travelling (e.g., roadways, weather, traffic, events, etc.). Additionally, or alternatively, the route can be based at least in part the autonomy capabilities of the autonomous vehicle (e.g., ability to complete an unprotected left-hand turn, U-turn, etc.). In some implementations, the routing service can be configured to assign, coordinate, monitor, adjust, etc. one or more designated pick-up and/or drop-off zones for the vehicle service(s). The routing service can be available to first party autonomous vehicles 220A. In addition, or alternatively, the routing service can be available to third party autonomous vehicles 220B if permitted/requested by an associated third party vehicle provider.

The backend service(s) 215 can include a rider experience service. The rider experience service can be configured to communicate data to a rider associated with the vehicle service. This can include, for example, upcoming vehicle actions, routes, drop-off zones, user adjustable vehicle conditions (e.g., music, temperature, etc.). Such information can be presented via a display device of an onboard tablet associated with an autonomous vehicle, a user device associated with the rider, etc. through a software application associated with the service entity.

The backend service(s) 215 can include a remote assistance service. The remote assistance service can be configured to provide remote assistance to an autonomous vehicle and/or a user (e.g., a rider associated with the vehicle service, etc.). For example, a remote assistance operator can take over control of one or more vehicle operations and/or otherwise assist an autonomous vehicle during the one or more vehicle operations. By way of example, a remote assistance operator can remotely control the navigation of an autonomous vehicle to navigate the vehicle around/past an unexpected obstruction in a travel way (e.g., a fallen tree, etc.). In another example, the remote assistance operator can communicate with a user (e.g., via the onboard tablet, user's phone, etc.) in the event that the user is in need of help.

The backend service(s) 215 can include a simulation/testing service. The simulation/testing service can help facilitate vehicle provider integration with the service platform. For example, simulation/testing service can provide testing environments for vehicle providers to simulate communications and/or the performance of vehicle services using the service infrastructure 200.

The backend service(s) 215 can include one or more other services. This can include, for example, payment services, vehicle rating services, health and maintenance services, software update/deployment services, and/or other services.

In some implementations, one or more backend services 215 that are available to the first party autonomous vehicles 220A (e.g., via the first application programming interface platform 205A) may not be available to the third party autonomous vehicles 220B (e.g., via the second application programming interface platform 205B), and vice versa. For example, a software update/deployment service for the first party autonomous vehicles 220A may not be accessible or suitable for a third party autonomous vehicle 220B that utilizes the onboard autonomy software of a third party vehicle provider (not the service entity). As such, a software update/deployment backend service may not be able to communicate with a third party autonomous vehicle 220B and/or vice versa.

In some implementations, the service infrastructure 200 can include a test platform for validating and vetting end-to-end platform functionality, without use of a real vehicle on the ground. For example, the test platform can simulate trips with human drivers and/or support fully simulated trip assignment and/or trip workflow capabilities. For example, the test platform can simulate and monitor data traffic through the service infrastructure 200 to ensure proper functioning. In some implementations, the testing platform can access the simulation/testing backend to help facilitate a test or simulation.

In some implementations, the service infrastructure 200 can utilize a plurality of software development kits (SDKs) that help provide access to the first and second application programming interface platforms 205A, 205B. All (or a portion of) external communication with the platforms can be done via the SDKs. For example, the SDKs can include a first SDK (e.g., private SDK) and a second SDK (e.g., public SDK) and specific endpoints to facilitate communication with the first and second application programming interface platforms 205A, 205B, respectively. In some implementations, the first party autonomous vehicle(s) 220A (and/or a test platform) can use both the first and second SDKs, whereas the third party autonomous vehicles 220B and/or the third party vehicle provider computing systems 245A, 245B can use only the second SDK and associated endpoints. In some implementations, the SDKs can provide a single entry point, which can improve consistency across both the service provider fleet and the third party entity fleet(s). As an example, a second SDK can provide secured access to the second application interface platform 205B and access to capabilities such as vehicle service assignments, routing, and/or the like. The first SDK can be accessed by the first party autonomous vehicles 220A and provide access to capabilities including those available only to the first party autonomous vehicles 220A.

In some implementations, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service entity's services. For example, based on the authentication certificate, a command-line interface can determine which version of the SDK to which to provide access. In some implementations, SDKs can be implemented onboard a first or third party autonomous vehicle 220A, 220B and/or a third party vehicle provider computing system 245A, 245B.

In some implementations, the service infrastructure 200 can facilitate communication between the service platform and one or more other system(s)/platform(s) 250 associated with the service entity/operations computing system. By way of example, the service entity may have (e.g., the operations computing system may include, etc.) one or more other system(s)/platform(s) 250 that can help indicate what services/vehicles are available to a user or other system, coordinate the provision of vehicle services by human-driven vehicles, and/or are specifically associated with certain types of services (e.g., delivery services, aerial transport services, etc.). The other system(s)/platform(s) 250 may communicate with the service platform utilizing the service infrastructure 200 (e.g., first application programing interface platform 205A, second application programming interface platform 205B, etc.) to determine, for example, whether any autonomous vehicles would be available to the user for any potential vehicle services.

Figure 3:
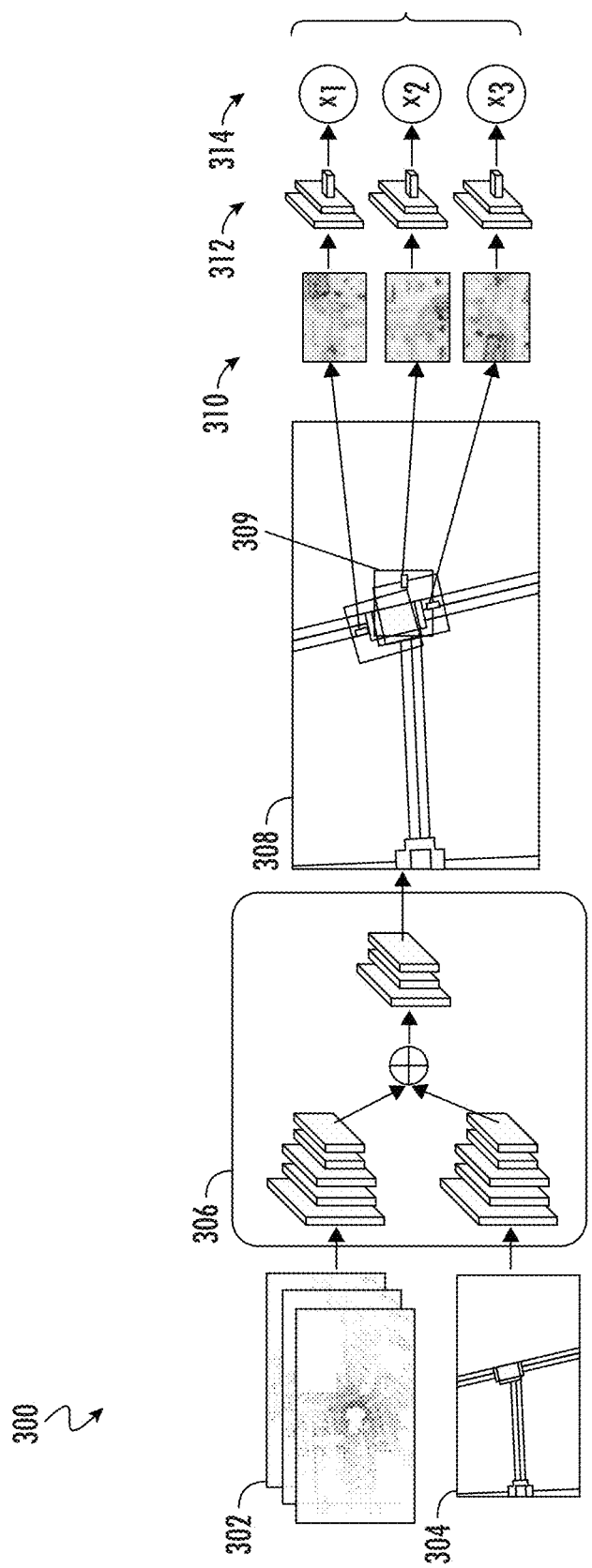
FIG. 3 depicts a flow diagram of an example feature extraction according to example aspects of the present disclosure.

FIG. 3 depicts a flow diagram 300 of an example feature extraction according to example aspects of the present disclosure. The feature extraction can be performed using sensor data 302 and/or map data 304. In some implementations, sensor data 302 can correspond to sensor data 155 of FIG. 1, while map data 304 can correspond to map data 160 of FIG. 1. For instance, one or more sensor(s) (e.g., onboard an autonomous vehicle) can be configured to acquire sensor data 302 (e.g., one or more sensor observations). The sensor(s) can be external sensors configured to acquire external sensor data and/or internal sensors configured to acquire internal sensor data. For instance, a surrounding environment of a vehicle can include/be represented in the field of view of the sensor(s). For instance, the sensor data 302 can be or can include image and/or other data of the environment outside of the vehicle and within a range and/or field of view of one or more of the sensor(s). For instance, the sensor data 302 can be or can include one or more of Light Detection and Ranging (LIDAR) data, one Radio Detection and Ranging (RADAR) data, image data from one or more cameras (e.g., visible spectrum cameras, infrared cameras, etc.), detection and/or ranging data from one or more motion sensors, audio data from one or more audio sensors (e.g., microphones, etc.), and/or other sensor data from any suitable types of imaging capture devices and/or sensors.

The map data 304 can provide detailed information about the surrounding environment of an autonomous vehicle and/or the geographic area in which an autonomous vehicle was, is, and/or will be located. For example, the map data 304 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists a vehicle computing system in processing, analyzing, and perceiving its surrounding environment and its relationship thereto. In some implementations, the map data 304 can include high definition map data. In some implementations, the map data 304 can include sparse map data indicative of a limited number of environmental features (e.g., lane boundaries, etc.). In some implementations, the map data can be limited to geographic area(s) and/or operating domains in which an autonomous vehicle (or autonomous vehicles generally) may travel (e.g., due to legal/regulatory constraints, autonomy capabilities, and/or other factors).

The sensor data 302 and/or the map data 304 (e.g., one or more scene observations) can be provided to a scene feature extraction model 306. For instance, the scene feature extraction model 306 can be or can include a backbone network, such as a convolutional backbone network. For instance, the backbone network can be a lightweight backbone network adapted for feature extraction. In some implementations, two separate streams can be instantiated such that the voxelized LiDAR and rasterized map are processed separately. The resulting features from both streams can then be concatenated feature-wise (e.g., if they share the same spatial resolution) and fused by a convolutional header. These extracted features can inform both the downstream detection and motion forecasting networks. In some implementations, the scene feature extraction model 306 (e.g., the backbone network) includes two convolutional layers to output a classification or confidence score and/or a bounding box for each anchor location (e.g., each scene feature). These features are eventually reduced to the final set of candidates by applying non-maximal suppression (NMS) and finally thresholding low probability detections (given by the desired common recall). In some implementations, a backbone network along with features for object detection and per actor feature extraction are provided. The scene feature extraction model 306 can produce scene features 308 (also referred to as global features).

The one or more scene features 308 can be provided to an actor feature recognition model. As used herein, unless indicated otherwise, an "actor feature recognition model" can refer to any collection of one or more operations to recognize one or more actor features corresponding to actors or traffic participants from a broader one or more scene features. For instance, the actor feature recognition model can parse the scene features into actor features that correspond to an actor. For instance, the one or more actor features can include data descriptive of an actor context of one or more traffic participants. For instance, rotated region of interest (ROI) align can be applied to the scene features 308 to extract (e.g., fixed size) spatial feature maps 309 for bounding boxes with arbitrary shapes and rotations from the scene features 308. The region around each spatial feature map 309 can be pooled to produce pooled actor features 310. For instance, a region around each actor in its frame can be pooled, such as with an axis defined by the actor's centroid orientation. The pooled actor features 310 may be larger than the eventual actor features. The pooled actor features 310 can be downsampled by applying one or more downsampling convolutional neural networks (CNNs) 312. As one example, a 4-layer down-sampling convolutional network can be applied. Additionally, and/or alternatively, the pooled actor features 310 can be max-pooled along spatial dimensions to reduce each pooled actor feature 310 to a respective actor feature 314 (e.g., an actor context). For instance, after the downsampling CNN 312 is applied, it can be followed by max-pooling along the spatial dimensions to reduce the pooled actor features 310 to a desired dimensional feature vector 314 per actor. One example convolutional network 312 uses a dilation factor of 2 for the convolutional layers to enlarge the receptive field for the per-actor features, which can improve performance.

Figure 4:
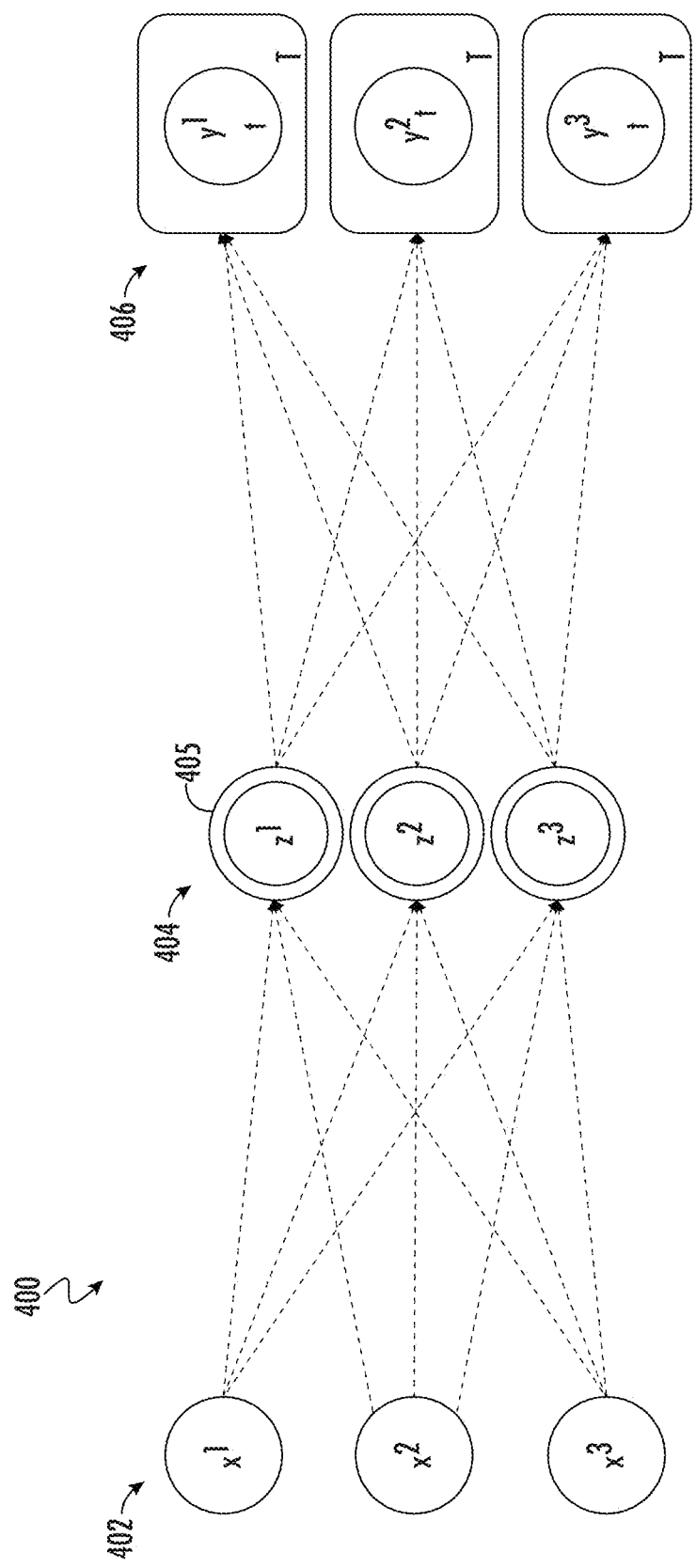
FIG. 4 depicts a diagram of an example latent distribution according to example aspects of the present disclosure.

FIG. 4 depicts a diagram 400 of an example latent distribution according to example aspects of the present disclosure. For instance, a latent distribution 404 can be established to map from a plurality of actor contexts 402 (e.g., x1, x2 . . . ) to a plurality of predicted future trajectories 406 (e.g., y1, y2 . . . ). As one example, a latent prior model (e.g., latent prior model 510 of FIG. 5) can be configured to map the actor contexts 402 to the latent distribution 404. As illustrated in FIG. 4, the latent distribution 404 can include a plurality of latent variables 405 (e.g., z1, z2, . . . ). For instance, in some implementations, each latent variable 404 can correspond to a unique actor represented by a unique actor context 402 and/or a unique future trajectory 406. For instance, in some implementations, the latent distribution 404 can be partitioned as a distributed representation where each latent variable 405 in the scene latent distribution 404 is anchored to a respective actor, such as anchored to a particular node in an interaction graph with traffic participants as nodes. The distributed representation may provide the benefit of naturally scaling the capacity of the latent distribution as the number of actors grows. Furthermore, the anchoring may give the model an inductive bias that eases the learning of a scene latent distribution. Intuitively, each anchored latent variable 405 encodes unobserved dynamics most relevant to its respective actor, including interactions with neighboring actors and traffic rules that apply in its locality. For instance, each latent variable 405 can be represented as a diagonal multivariate Gaussian. Each latent variable 405 can be conditioned on all actors such that the latent distribution is not marginally independent across actors, although factorized. For instance, despite anchoring each partition of the scene latent to an actor, each individual latent variable 405 can contain information about the full scene, since each final node representation is dependent on the entire input because of the message propagation in the fully-connected interaction graph. In some implementations, scene interaction modules including one or more graph neural networks can be used to produce the latent distribution 404 based at least in part on the actor contexts 402 and/or to produce predicted trajectories 406 based at least in part on samples of the latent distribution 404. For instance, in some implementations, a decoder model (e.g., decoder model 516 of FIG. 5) can map samples of the latent distribution 404 to the predicted trajectories 406.

Figure 5:
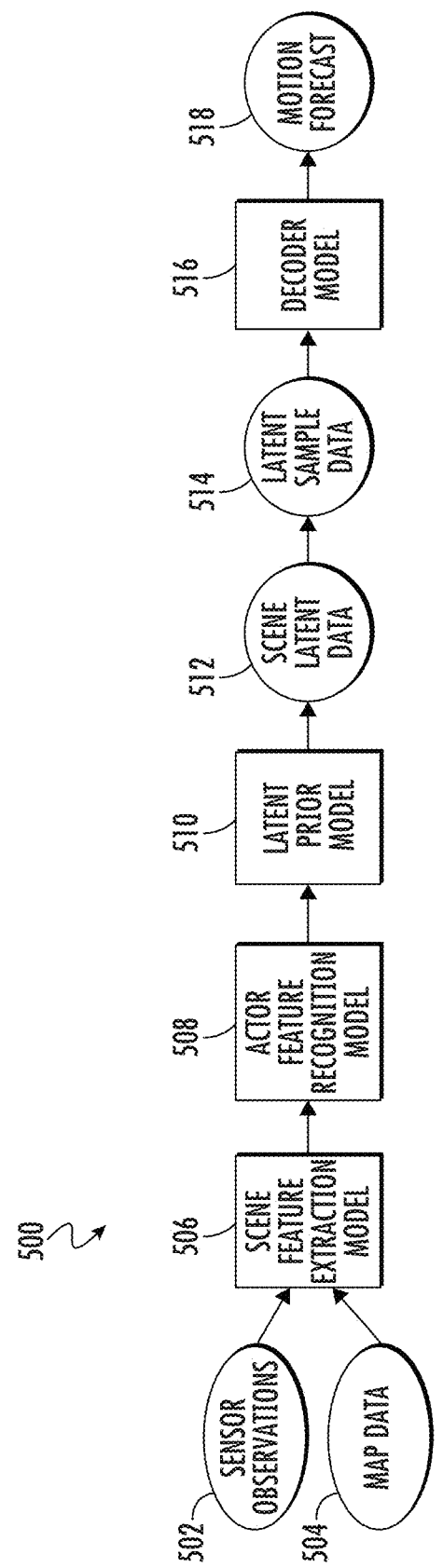
FIG. 5 depicts a flow diagram of an example implicit latent variable model according to example aspects of the present disclosure.

FIG. 5 depicts a flow diagram of an example implicit latent variable model 500 according to example aspects of the present disclosure. The implicit latent variable model 500 can receive as input sensor data 502 and/or map data 504. In some implementations, sensor data 502 can correspond to sensor data 155 of FIG. 1 and/or sensor data 302 of FIG. 3, while map data 504 can correspond to map data 160 of FIG. 1 and/or map data 304 of FIG. 3. For instance, one or more sensor(s) (e.g., onboard an autonomous vehicle) can be configured to acquire sensor data 502 (e.g., one or more sensor observations). The sensor(s) can be external sensors configured to acquire external sensor data and/or internal sensors configured to acquire internal sensor data. For instance, a surrounding environment of a vehicle can include/be represented in the field of view of the sensor(s). For instance, the sensor data 502 can be or can include image and/or other data of the environment outside of the vehicle and within a range and/or field of view of one or more of the sensor(s). For instance, the sensor data 502 can be or can include one or more of Light Detection and Ranging (LIDAR) data, one Radio Detection and Ranging (RADAR) data, image data from one or more cameras (e.g., visible spectrum cameras, infrared cameras, etc.), detection and/or ranging data from one or more motion sensors, audio data from one or more audio sensors (e.g., microphones, etc.), and/or other sensor data from any suitable types of imaging capture devices and/or sensors.

The map data 504 can provide detailed information about the surrounding environment of an autonomous vehicle and/or the geographic area in which an autonomous vehicle was, is, and/or will be located. For example, the map data 504 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists a vehicle computing system in processing, analyzing, and perceiving its surrounding environment and its relationship thereto. In some implementations, the map data 504 can include high definition map data. In some implementations, the map data 504 can include sparse map data indicative of a limited number of environmental features (e.g., lane boundaries, etc.). In some implementations, the map data can be limited to geographic area(s) and/or operating domains in which an autonomous vehicle (or autonomous vehicles generally) may travel (e.g., due to legal/regulatory constraints, autonomy capabilities, and/or other factors).

The sensor data 502 and/or the map data 504 (e.g., one or more scene observations) can be provided to a scene feature extraction model 506. For instance, the scene feature extraction model 506 can be or can include a backbone network, such as a convolutional backbone network. For instance, the backbone network can be a lightweight backbone network adapted for feature extraction. In some implementations, two separate streams can be instantiated such that the voxelized LiDAR and rasterized map are processed separately. The resulting features from both streams can then be concatenated feature-wise (e.g., if they share the same spatial resolution) and fused by a convolutional header. These extracted features can inform both the downstream detection and motion forecasting networks. In some implementations, the scene feature extraction model 506 (e.g., the backbone network) includes two convolutional layers to output a classification or confidence score and/or a bounding box for each anchor location (e.g., each scene feature). These features are eventually reduced to the final set of candidates by applying non-maximal suppression (NMS) and finally thresholding low probability detections (given by the desired common recall). In some implementations, a backbone network along with features for object detection and per actor feature extraction are provided. The scene feature extraction model 506 can produce scene features (also referred to as global features).

The scene features can then be provided to an actor feature recognition model 508. The actor feature recognition model 508 can parse the scene features into actor features that correspond to an actor. For instance, the one or more actor features can include data descriptive of an actor context of one or more traffic participants. For instance, the actor feature recognition model 508 can be configured to extract spatial feature maps for bounding boxes from the one or more scene features by rotated region of interest (ROI) align. Rotated ROI align can be applied to extract (e.g., fixed size) spatial feature maps for bounding boxes with arbitrary shapes and rotations from the scene features (e.g., the global feature map extracted by the backbone). For instance, rotated ROI align can provide actor contexts for each actor.

Additionally and/or alternatively, the actor feature recognition model 508 can be configured to pool a region around each spatial feature map to produce pooled actor features. For instance, a region around each actor in its frame can be pooled, such as with an axis defined by the actor's centroid orientation. The pooled actor features may be larger than the eventual actor features.

Additionally and/or alternatively, the actor feature recognition model 508 can be configured to downsample the pooled actor features by applying one or more downsampling convolutional neural networks. As one example, a 4-layer down-sampling convolutional network can be applied.

Additionally and/or alternatively, the actor feature recognition model 508 can be configured to max-pool along spatial dimensions to reduce each pooled actor feature to a respective actor feature of the one or more actor features. For instance, after the downsampling CNN is applied, it can be followed by max-pooling along the spatial dimensions to reduce the feature map to a desired dimensional feature vector per actor. One example convolutional network uses a dilation factor of 2 for the convolutional layers to enlarge the receptive field for the per-actor features, which can improve performance. One or more actor features can be obtained from the actor feature recognition model 508.

The scene data including the one or more actor features can then be provided to a latent prior model 510. The latent prior model 510 can be configured to generate scene latent data in response to receipt of scene data. In some implementations, the latent prior model 510 can be or can include a scene interaction module including one or more graph neural networks. The scene latent data 512 can be or can include one or more latent variables. In some implementations, the scene latent data 512 can include a latent distribution that is partitioned into one or more latent variables. As one example, the one or more latent variables of the scene latent data 512 can be partitioned with respect to actor contexts, such as depicted in FIG. 4 by latent variables 405. For instance, in some implementations, the one or more latent variables can be respective to the one or more actor features such that each actor feature has an associated latent variable of the scene latent data 512 that is anchored to the actor feature. In some implementations, the one or more latent variables can be or can include one or more continuous latent variables. Scene latent data 512 can be obtained from the latent prior model 510.

Latent sample data 514 can be sampled from the scene latent data 512. For instance, the scene latent data 512 (e.g., the one or more latent variables) can define a latent (e.g., a latent distribution) that can be sampled to produce latent samples 514 of the scene latent data 512. The latent sample data 514 can define a possible future for the actors (e.g., the actor features).

The latent sample data 514 can be provided to a decoder model 516. The decoder model 516 can be configured to decode the latent sample data 514 into a motion forecast 518 including one or more predicted trajectories of the one or more actor features. For instance, the decoder model 516 can produce a motion forecast 518 from latent samples. The motion forecast 518 including one or more predicted trajectories of one or more actor features can be received from the decoder model 516.

In some implementations, the decoder model 516 can be or can include a deterministic decoder model 516. For instance, the decoder can be or can include a deterministic mapping to implicitly characterize the joint probability, such as opposed to explicitly representing it in a parametric form. This approach can provide for evaluation without factorizing the joint distribution and thus can sidestep potential associated challenges. In particular, the deterministic decoder can be highly beneficial for generating socially consistent trajectories. In this framework, generating scene-consistent future trajectories across actors is simple and highly efficient, as it may be performed with only one stage of parallel sampling.

In some implementations, the decoder model 516 can be or can include a scene interaction module including one or more graph neural networks. For instance, the decoder including a scene interaction module can predict a realization of the future at the scene level via message parsing. As an example, each actor trajectory can be established with respect to samples from each latent variable of the scene latent data 512 and/or each actor feature. This can provide for improved reasoning about multi-agent interactions such as car following, yielding, etc. For instance, each actor context can be initialized as a node in the decoder SIM. After a round of message parsing, each node can then contain an updated representation of a respective actor that takes into account the underlying dynamics of the scene summarized in the latent distribution. Finally, the trajectory sample for the actor can be deterministically decoded, such as by the output function of the SIM. For instance, the output function can be the deterministic mapping. This can be performed without requiring any additional sampling steps. The trajectory-level scene sample can thus be a collection of all actor trajectories.

In some implementations, the decoder model 516 can be or can include a specified and tractable conditional likelihood. In this implementation, many tools are available for inference and learning. As one example, variational inference, such as the variational auto-encoder (VAE), can be used.

In some implementations, the decoder model 516 can be characterized via a stochastic sampling procedure where a conditional dependence is not specified. In this case, likelihood-free inference methods can be employed for learning. As examples, density estimation can be implemented by comparison using either density ratio (GAN) or density difference (MMD).

Figure 6:
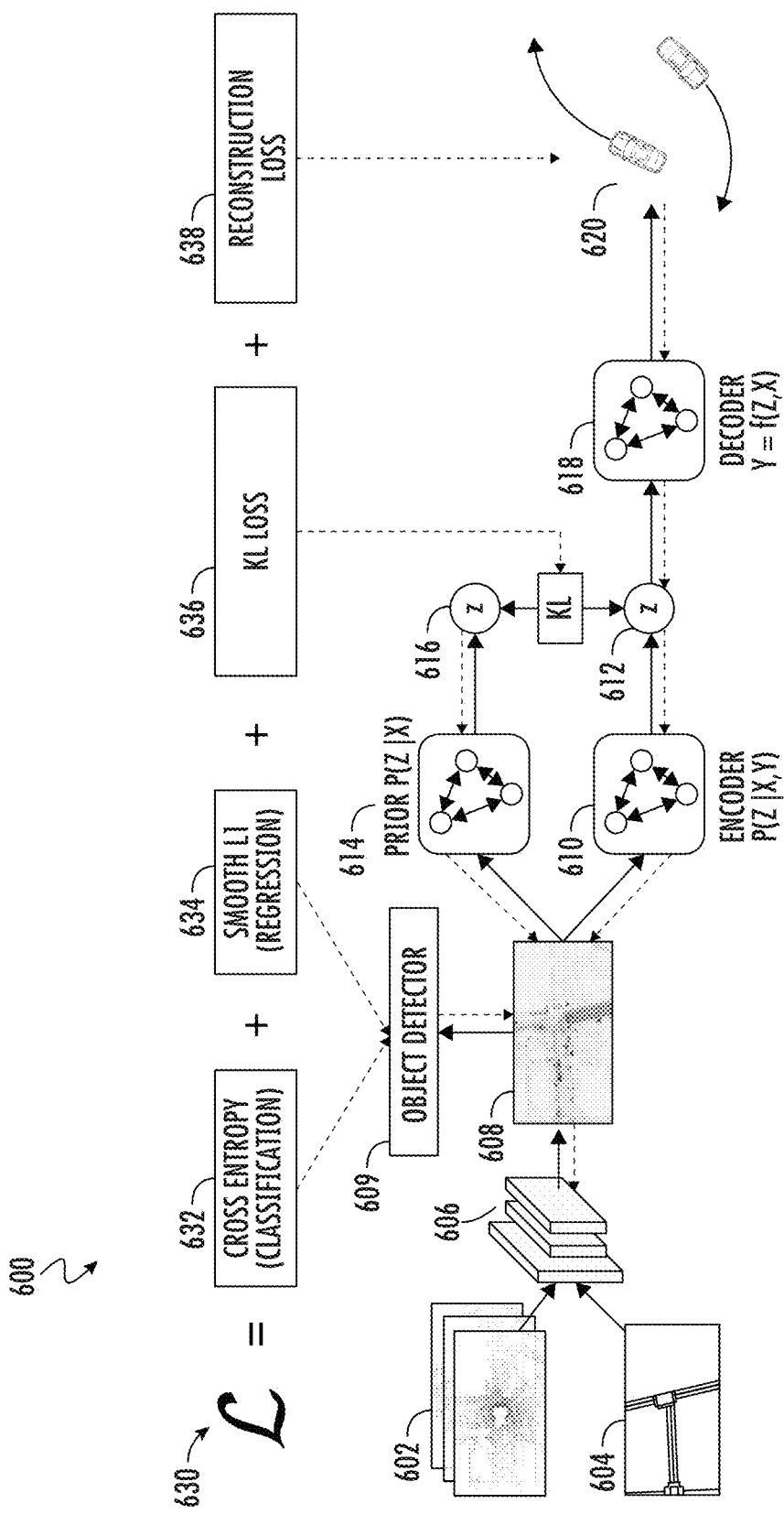
FIG. 6 depicts a flow diagram of training an example implicit latent variable model according to example aspects of the present disclosure.

FIG. 6 depicts a flow diagram of training an example implicit latent variable model 600 according to example aspects of the present disclosure. For instance, FIG. 6 illustrates components of a training loss 630 that can be established during training of the model 600. As illustrated in FIG. 6, sensor data 602 and/or map data 604 can be provided to a feature extraction model 606 to produce one or more actor features 608, as described herein. The one or more actor features 608 can be provided to an object detector 609 to detect objects (e.g., actors). The sensor data 602 and/or map data 604 can be at least a portion of a training dataset including ground truth data, such as ground truth data including a ground truth context of the one or more actor features 608. The ground truth context can be descriptive of a known context of the actor features 608, such as a known position, pose, velocity, etc. For instance, the ground truth data can include training features including known contexts of the actor features. A feature loss can be determined between one or more predicted features from the object detector 609 and the training features. For instance, the feature loss can include a cross-entropy loss 632 between the one or more predicted features and one or more training features of the ground truth data. Additionally and/or alternatively, the feature loss can include a regression loss 634 between bounding boxes of the one or more predicted features and bounding boxes of the ground truth data. For instance, in some implementations, the feature loss includes a cross entropy loss 632 applied to detection scores of the predicted features and/or a smooth L1 634 applied to the bounding box regression targets of the one or more predicted features. The training loss 630 can be or can include the cross entropy loss 632 and/or the regression loss 634.

The training examples labeled with ground truth data can be provided to a latent encoder model 610. The latent encoder model 610 can be configured to produce a first latent distribution 612 in response to receipt of the one or more training examples and the ground truth data. For instance, in some cases, integration over the scene latent distribution is intractable, in which case amortized variational inference can be used. For instance, by introducing an encoder distribution to approximate the true posterior, the learning problem can be reformulated as a maximization of the Evidence Lower BOund (ELBO). In some implementations, the latent encoder model 610 can include a scene interaction module. For instance, after running one round of message passing, the scene interaction module can predict the distribution over latent variables.

The encoder model 610 can approximate the true posterior latent distribution. This model may also be called a recognition network. Because the encoder model 610 receives the ground truth data (e.g., the target output) as an input, it can recognize scene dynamics that are unobserved by the latent prior model 614. In this manner, the encoder may only be used during training, since it requires access to the ground-truth future trajectories. For instance, the encoder may be omitted from deployed models and/or included at an online training system.

Additionally, the one or more training examples can be provided to a latent prior model 614. The latent prior model 614 can be configured to produce a second latent distribution 616 in response to receipt of the one or more training examples. For instance, the latent prior model 614 can be agnostic to the ground truth data such that the latent prior model 614 is usable during inference (e.g., during prediction after ground truth data has already been used to train the prior model 614). The latent prior model 614 may be utilized during inference.

A divergence loss 636 can be determined based at least in part on the first latent distribution 612 and the second latent distribution 616. For instance, in some implementations, the divergence loss 636 can be or can include a KL divergence loss 636 between the first latent distribution 612 and the second latent distribution 616. The training loss 630 can be or can include the divergence loss 636.

Samples from the first latent distribution 612 and/or the second latent distribution 616 can be provided to decoder model 618 to produce motion forecast(s) 620. The motion forecast(s) 620 can be used to produce a reconstruction loss 638. For instance, the reconstruction loss 638 can be obtained by sampling (e.g., by a computing system) the first latent distribution to produce one or more first latent samples. The first latent distribution can include first sample data, such as a first set of samples from the latent distribution. Determining the reconstruction loss 638 can further include sampling (e.g., by the computing system) the second latent distribution to produce one or more second latent samples. Determining the reconstruction loss 638 can further include providing (e.g., by the computing system) the one or more first latent samples to a decoder model 618 and receiving (e.g., by the computing system) one or more first predicted trajectories 620 from the decoder model 618. The first predicted trajectories 620 can be representative of a first possible future of the actor features. Determining the reconstruction loss 638 can further include providing (e.g., by the computing system) the one or more second latent samples to the decoder model 618 and receiving (e.g., by the computing system) one or more second predicted trajectories 620 from the decoder model 618. The second predicted trajectories 620 can be representative of a second possible future of the actor features that desirably matches the first possible future. Determining the reconstruction loss 638 can include determining (e.g., by the computing system) a reconstruction loss 638 based at least in part on the one or more first predicted trajectories 620 and the one or more second predicted trajectories 620. For instance, the reconstruction loss 638 can be based at least in part on a difference between the one or more first predicted trajectories 620 and the one or more second predicted trajectories 620. In some implementations, the reconstruction loss 638 can include a Huber loss. The training loss 630 can be or can include the reconstruction loss 638.

Figure 7:
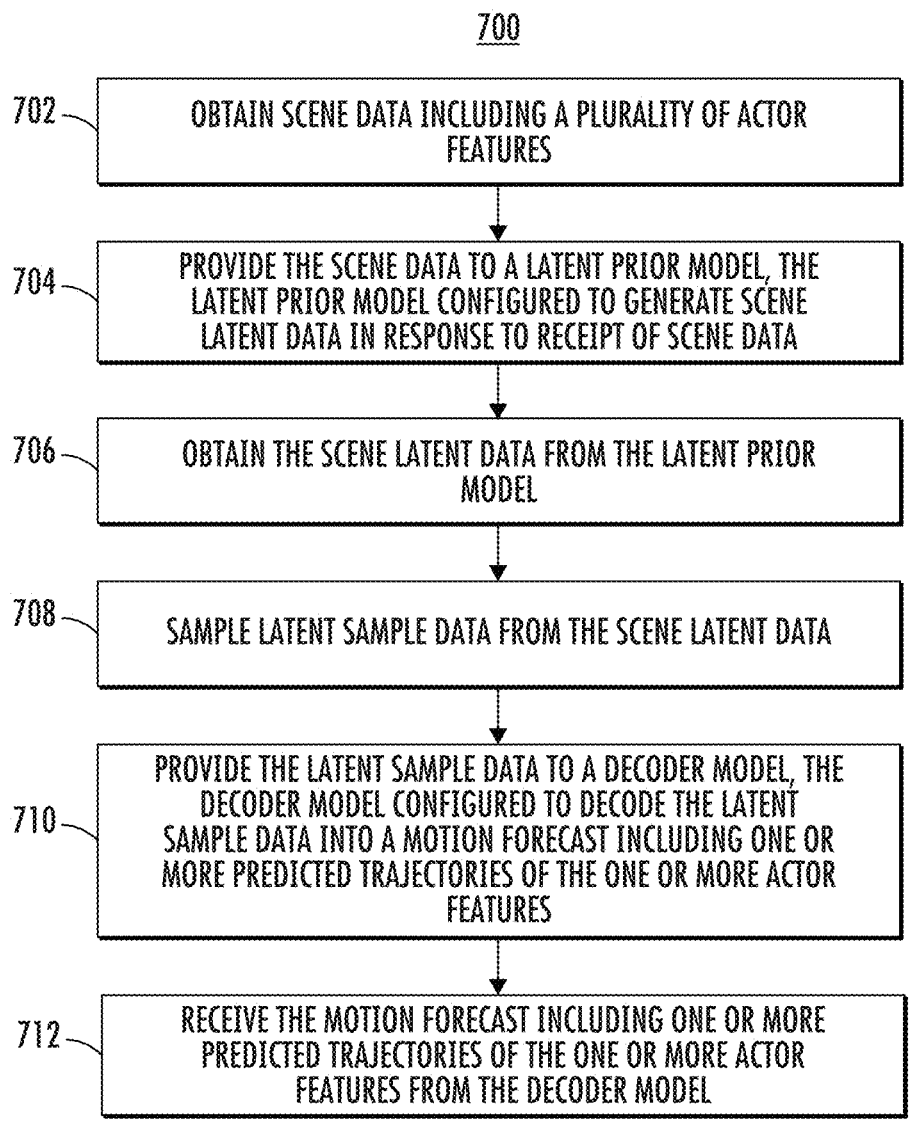
FIG. 7 depicts a flow chart diagram of an example method for determining scene-consistent motion forecasts from sensor data according to example aspects of the present disclosure.

FIG. 7 depicts a flow chart diagram of an example method 700 for determining scene-consistent motion forecasts from sensor data according to example aspects of the present disclosure. One or more portions of the method 700 described herein can be implemented as an algorithm on the hardware components of the devices described herein (e.g., as in FIGS. 1, 2, 12, 13) to, for example, generate scenarios using parametric modeling and conducting simulations to test autonomous vehicle (e.g., autonomous vehicle 105 in FIG. 1) using those generated scenarios. Although FIG. 7 depicts steps performed in a particular order for purposes of illustration and discussion, method 700 of FIG. 7 is not limited to the particularly illustrated order or arrangement. The various steps of the methods disclosed herein can be omitted, rearranged, combined, and/or adapted in various ways without deviating from the scope of the present disclosure. The various steps are described, for example, as being performed by a computing system onboard an autonomous vehicle for example purposes. One or more portions could also, or alternatively, be performed by a system offboard/remote from the autonomous vehicle.

The computer-implemented method 700 can include, at 702, obtaining (e.g., by a computing system including one or more computing devices) scene data including one or more actor features. In some implementations, the scene data can be extracted or otherwise obtained from one or more scene observations. For instance, in some implementations, the scene data can be obtained by method 800 of FIG. 8.

Additionally and/or alternatively, the method 700 can include, at 704, providing (e.g., by the computing system) the scene data to a latent prior model. The latent prior model can be configured to generate scene latent data in response to receipt of scene data. In some implementations, the latent prior model can be or can include a scene interaction module including one or more graph neural networks. The scene latent data can be or can include one or more latent variables. In some implementations, the scene latent data can include a latent distribution that is partitioned into one or more latent variables. For instance, in some implementations, the one or more latent variables can be respective to the one or more actor features such that each actor feature has an associated latent variable of the scene latent data that is anchored to the actor feature. In some implementations, the one or more latent variables can be or can include one or more continuous latent variables. Additionally and/or alternatively, the method 700 can include, at 706, obtaining (e.g., by the computing system) the scene latent data from the latent prior model.

For instance, the generative process of future trajectories over actors can be formulated with a latent variable model including one or more latent variables that intuitively capture unobserved scene dynamics such as actor goals and style, multi-agent interactions, or future traffic light states. This modeling intuitively encourages the latent distribution to capture stochasticity in the generative process. In some implementations, the latent distribution can be a continuous latent distribution including one or more continuous latent variables for high expressivity.

Producing a latent distribution that can capture all the uncertainties in any scenario can present challenges, as scenarios can vary drastically in the number of actors, the road topology, and/or traffic rules. This challenge can be mitigated by partitioning the scene latent distribution and obtaining a distributed representation where each latent variable in the scene latent distribution is anchored to a respective actor, such as anchored to a particular node in an interaction graph with traffic participants as nodes. The distributed representation may provide the benefit of naturally scaling the capacity of the latent distribution as the number of actors grows. Furthermore, the anchoring may give the model an inductive bias that eases the learning of a scene latent distribution. Intuitively, each anchored latent variable encodes unobserved dynamics most relevant to its respective actor, including interactions with neighboring actors and traffic rules that apply in its locality. For instance, each latent variable can be represented as a diagonal multivariate Gaussian. Each latent variable can be conditioned on all actors such that the latent distribution is not marginally independent across actors, although factorized. For instance, despite anchoring each partition of the scene latent to an actor, each individual latent variable can contain information about the full scene, since each final node representation is dependent on the entire input because of the message propagation in the fully-connected interaction graph.

Additionally and/or alternatively, the method 700 can include, at 708, sampling (e.g., by the computing system) latent sample data from the scene latent data. For instance, the scene latent data (e.g., the one or more latent variables) can define a latent (e.g., a latent distribution) that can be sampled to produce latent samples of the scene latent data. The latent sample data can define a possible future for the actors (e.g., the actor features).

Additionally and/or alternatively, the method 700 can include, at 710, providing (e.g., by the computing system) the latent sample data to a decoder model. The decoder model can be configured to decode the latent sample data into a motion forecast including one or more predicted trajectories of the one or more actor features. For instance, the decoder model can produce a motion forecast from latent samples. Additionally and/or alternatively, the method 700 can include, at 712, receiving (e.g., by the computing system) the motion forecast including one or more predicted trajectories of the one or more actor features from the decoder model.

In some implementations, the decoder model can be or can include a deterministic decoder model. For instance, the decoder can be or can include a deterministic mapping to implicitly characterize the joint probability, such as opposed to explicitly representing it in a parametric form. This approach can provide for evaluation without factorizing the joint distribution and thus can sidestep the associated challenges. In particular, the deterministic decoder can be highly beneficial for generating socially consistent trajectories. In this framework, generating scene-consistent future trajectories across actors is simple and highly efficient, as it may be performed with only one stage of parallel sampling.

In some implementations, the decoder model can be or can include a scene interaction module including one or more graph neural networks. For instance, the decoder including a scene interaction module can predict a realization of the future at the scene level via message parsing. As an example, each actor trajectory can be established with respect to samples from each latent variable of the scene latent data and/or each actor feature. This can provide for improved reasoning about multi-agent interactions such as car following, yielding, etc. For instance, each actor context can be initialized as a node in the decoder SIM. After a round of message parsing, each node can then contain an updated representation of a respective actor that takes into account the underlying dynamics of the scene summarized in the latent distribution. Finally, the trajectory sample for the actor can be deterministically decoded, such as by the output function of the SIM. For instance, the output function can be the deterministic mapping. This can be performed without requiring any additional sampling steps. The trajectory-level scene sample can thus be a collection of all actor trajectories.

In some implementations, the decoder model can be or can include a specified and tractable conditional likelihood. In this implementation, many tools are available for inference and learning. As one example, variational inference, such as the variational auto-encoder (VAE), can be used.

In some implementations, the decoder can be characterized via a stochastic sampling procedure where a conditional dependence is not specified. In this case, likelihood-free inference techniques can be required for learning. As examples, density estimation by comparison using either density ratio (GAN) or density difference (MMD). These techniques, however, may be more difficult to optimize.

In some implementations the prior model, the encoder model, and/or the decoder model can include a scene interaction model. The scene interaction model can be configured to model the latent distribution as an interaction graph including one or more nodes representative of the one or more actor features and one or more edges representative of interactions between the one or more actor features. For instance, in some implementations, the scene interaction model can include one or more graph neural networks. In some implementations, a message function of the one or more graph neural networks can include a multi-layer perceptron model that takes as input one or more terminal nodes of the one or more nodes at a previous propagation step of the one or more graph neural networks. For instance, the edge or message function of the graph neural network(s) in the scene interaction module can include, for example, a 3-layer MLP (multi-layer perceptron) that takes as input the hidden states of the two terminal nodes at each edge in the graph at the previous propagation step. Additionally and/or alternatively, the input can include the projected coordinates of their corresponding bounding boxes. In some implementations, an aggregation function of the one or more graph neural networks includes a feature-wise max-pooling aggregation function. In some implementations, a gated recurrent unit cell is configured to update a state (e.g., hidden state) of the one or more nodes. In some implementations, the scene interaction module can include an output network that outputs the results from the graph propagations, such as a 2-layer MLP.

The scene interaction module can model the latent distribution as an interaction graph, which can provide improved understanding of spatial information. This spatial information can be beneficial in jointly forecasting future trajectories of each actor. For instance, the node state of each node can be initialized with a set of actor features and known spatial information. The spatial information can include information such as relative coordinates of the actors relative to their peers or neighbors. In some cases, during object detection and local feature extraction around each actor, however, it may not be possible to include some necessary global information due to the limited receptive field and/or the translation invariance of convolutional neural networks. To remedy this, the node states can be initialized as the concatenation of the deep local features and the spatial information of each actor or node in the graph, such as its location, heading and/or its dimensions (e.g., in Bird's Eye View). A learned double edge function can propagate messages around the nodes in the graph. Given these messages, each actor can aggregate the messages (e.g., via max pooling) to update a respective node state. In some implementations, the scene interaction model can perform a single round of message passing to update the nodes' representation, taking into account spatiotemporal relationships. The scene interaction module in the prior, encoder and/or decoder can capture scene-level understanding that is not present with independence assumptions at the latent or output level.

The systems and methods described herein can provide for efficiently sampling multiple possible futures from the latent distribution of the scene latent distribution. For instance, in some implementations, the method 700 can further include sampling (e.g., by the computing system) second latent sample data from the scene latent data. The second latent sample data can be descriptive of a differing possible future from the latent sample data. Additionally and/or alternatively, the method 700 can further include providing (e.g., by the computing system) the second latent sample data to the decoder model and receiving (e.g., by the computing system) a second motion forecast including one or more second predicted trajectories of the one or more actor features from the decoder model. The second predicted trajectories can differ from the predicted trajectories of other samples.

For instance, a first sample from the scene latent distribution provided to the decoder can produce one possible realization of the future trajectories. A second sample can result in a distinct future. The sampling process is illustrated sequentially for the purposes of illustration, parallel sampling and/or decoding can be employed in accordance with example aspects of the present disclosure. For instance, the samples may be independent, as the stochasticity in the system is present in the latent distribution (e.g., as opposed to the decoder).

Figure 8:
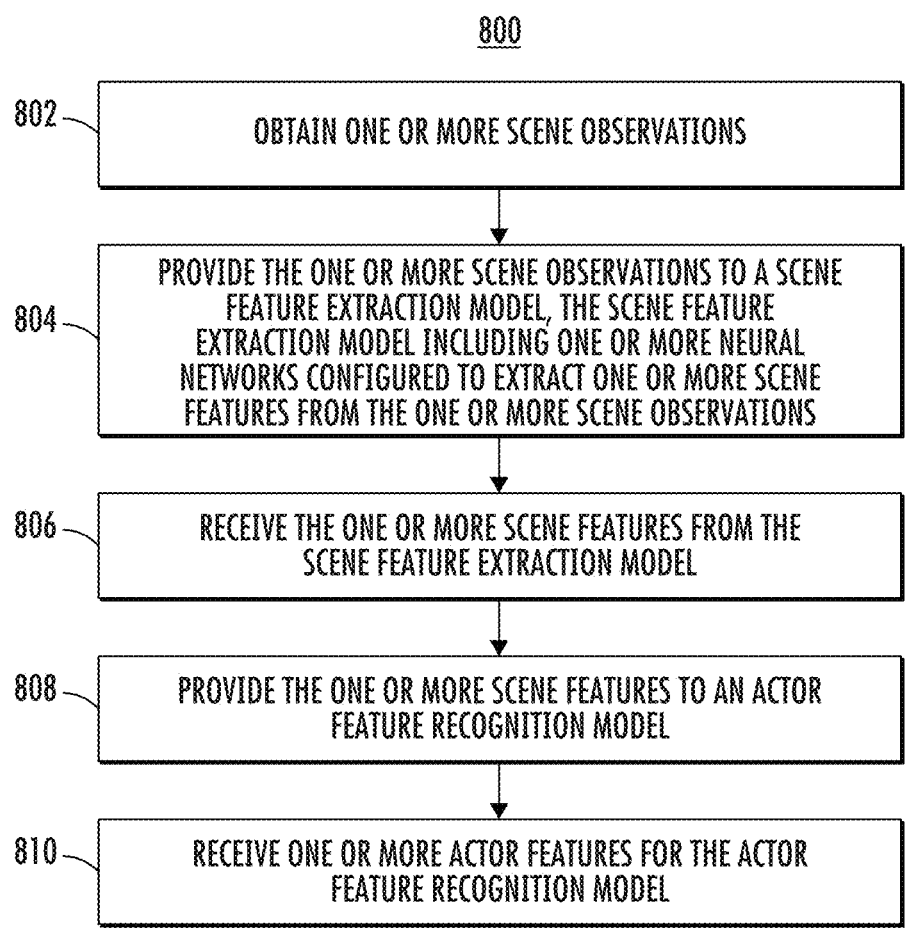
FIG. 8 depicts a flow chart diagram of an example method for recognizing actor features from sensor data according to example aspects of the present disclosure.

FIG. 8 depicts a flow chart diagram of an example method 800 for recognizing actor features from sensor data according to example aspects of the present disclosure. One or more portions of the method 800 described herein can be implemented as an algorithm on the hardware components of the devices described herein (e.g., as in FIGS. 1, 2, 12, 13) to, for example, generate scenarios using parametric modeling and conducting simulations to test autonomous vehicle (e.g., autonomous vehicle 105 in FIG. 1) using those generated scenarios. Although FIG. 8 depicts steps performed in a particular order for purposes of illustration and discussion, method 800 of FIG. 8 is not limited to the particularly illustrated order or arrangement. The various steps of the methods disclosed herein can be omitted, rearranged, combined, and/or adapted in various ways without deviating from the scope of the present disclosure. The various steps are described, for example, as being performed by a computing system onboard an autonomous vehicle for example purposes. One or more portions could also, or alternatively, be performed by a system offboard/remote from the autonomous vehicle.

For instance, the method 800 can include, at 802, obtaining (e.g., by a computing system including one or more computing devices) one or more scene observations. The scene observations can be or can include data descriptive of sensor observations from one or more sensors configured to observe the scene, such as, for example, one or more sensors mounted on an autonomous vehicle. The sensors can be any suitable sensors, such as, for example, cameras, LIDAR sensors, etc. As one example, in some implementations, the scene observations can be and/or can include a three-dimensional (3D) LIDAR point cloud. In some implementations, the LIDAR data can be voxelized. In some implementations, the scene observations can be oriented in a "Birds-Eye View" (BEV) or top-down representation.

In some implementations, the scene observations can additionally include map data, such as data descriptive of properties of roads, crosswalks, signage, intersections, railroads, buildings, and/or other terrain features of the scene. In some implementations, the map data can be rasterized. The map data can encode traffic elements such as intersections, lanes, roads, and traffic lights. In some implementations, elements with different semantics are encoded into different channels in the raster. Map elements that are rasterized can be or can include, for example, drivable surface polygons, road polygons, intersection polygons, straight vehicle lane polygons, dedicated left and right vehicle lane polygons, dedicated bike lane polygons, dedicated bus lane polygons, centerline markers for all lanes, lane dividers for all lanes with semantics (e.g., allowed to cross, not allowed to cross, might be allowed to cross.

In some implementations, the height dimension of the sensor observations can be normalized with dense ground-height information provided by map data. In some implementations, multiple LiDAR sweeps can be used to exploit motion cues by compensating the ego-motion, such as by projecting the past sweeps to the coordinate frame of the current sweep). Furthermore, in some implementations, the height and time dimension is raveled into the channel dimension, to provide for the use of 2D convolution to process spatial and/or temporal information efficiently. The final representation may thus be a 3D occupancy tensor.

The method 800 can include, at 804, providing (e.g., by the computing system) the one or more scene observations to a scene feature extraction model. The scene feature extraction model can include one or more neural networks configured to produce scene data including one or more actor features from the one or more scene observations. For instance, in some cases, the scene features can be extracted from raw sensor data and HD maps in a differentiable manner, such that perception and motion forecasting can be trained jointly end-to-end. In some implementations, the scene feature extraction model can be or can include a backbone network. For instance, the backbone network can be a lightweight backbone network adapted for feature extraction. In some implementations, two separate streams can be instantiated such that the voxelized LiDAR and rasterized map are processed separately. The resulting features from both streams can then be concatenated feature-wise (e.g., if they share the same spatial resolution) and fused by a convolutional header. These extracted features can inform both the downstream detection and motion forecasting networks. The method 800 can then include, at 806, receiving (e.g., by the computing system) the one or more scene features from the scene feature extraction model. The scene features may be features that may not each correspond to an actor in the scene, such as a global feature map. For instance, a CNN-based perception backbone network architecture can be used to extract rich geometrical and motion features about the whole scene from a past history of voxelized LiDAR point clouds and/or a raster map.

The method 800 can include, at 808, providing (e.g., by the computing system) the one or more scene features to an actor feature recognition model. The actor feature recognition model can parse the scene features into actor features that correspond to an actor. For instance, the one or more actor features can include data descriptive of an actor context of one or more traffic participants. In some implementations, the actor feature recognition model can implement some or all of the method 900 of FIG. 9.

For instance, in some implementations, the (e.g., scene) feature extraction model (e.g., the backbone model) includes two convolutional layers to output a classification or confidence score and/or a bounding box for each anchor location (e.g., each scene feature). These features are eventually reduced to the final set of candidates by applying non-maximal suppression (NMS) and finally thresholding low probability detections (given by the desired common recall). In some implementations, a backbone network along with features for object detection and per actor feature extraction are provided. The proposed mixture of trajectories output parameterization, where each way-point is a gaussian, is then used. In some cases, these baselines may not obtain temporally consistent samples, since the gaussians are independent across time (e.g., the models are not auto-regressive). To solve this, a heuristic sampler can be used to obtain temporally consistent samples from this model. The sampled trajectories are extracted using the re-parameterization technique for a bi-variate normal, where the model predicts a normal distribution per waypoint.

In some cases, the noise can be constant across time for a given sample and actor. Intuitively, having a constant noise across time steps can provide sampled waypoints whose relative location with respect to its predicted mean and covariance is constant across time (e.g., translated by the predicted mean and scaled by the predicted covariance per time). In some cases, to address the compounding error problem found in some auto-regressive models, adjustments can be made to the training procedure to account for the noise in the conditioning space. To help simulate the noise it sees during inference, gaussian noise can be added to the conditioning state. The amount of noise expected between time-steps can be tuned.

In some implementations, an object detection module can be responsible for recognizing other traffic participants in a scene, followed by a motion forecasting module that predicts how the scene might unroll given the current state or actor state of each actor. The actor state may be a compact representation of an actor, including qualities such as pose, velocity, and acceleration. This can be beneficial in some cases; however, it can be difficult to incorporate uncertainty due to sensor noise or occlusion. In some implementations, these two tasks can be combined by having a single model (e.g., a single fully convolutional backbone network) predict both the current and future states of actors. For instance, a single fully convolutional backbone network can predict both the current state and future state(s) for each pixel (e.g., in a bird's eye view grid) directly from sensor data, such as a voxelized LiDAR point-cloud, and/or map data, such as a semantic raster of an HD map. This approach can propagate uncertainty between the two tasks in the feature space, without the need of explicit intermediate representations.

For instance, the perception and prediction tasks seek to understand where other actors are currently located and/or how they might move in the next few seconds. This can be accomplished by leveraging (e.g., 3D) sensor data such as LiDAR point clouds for dynamic object recognition and/or high-definition maps which provide information about the static part of the environment. For instance, scene features can be extracted from LiDAR and maps and subsequently fused to produce rich features. Once rich features from the whole scene are extracted, object detection can be performed to recognize actor features corresponding to actors in the scenes.

Figure 9:
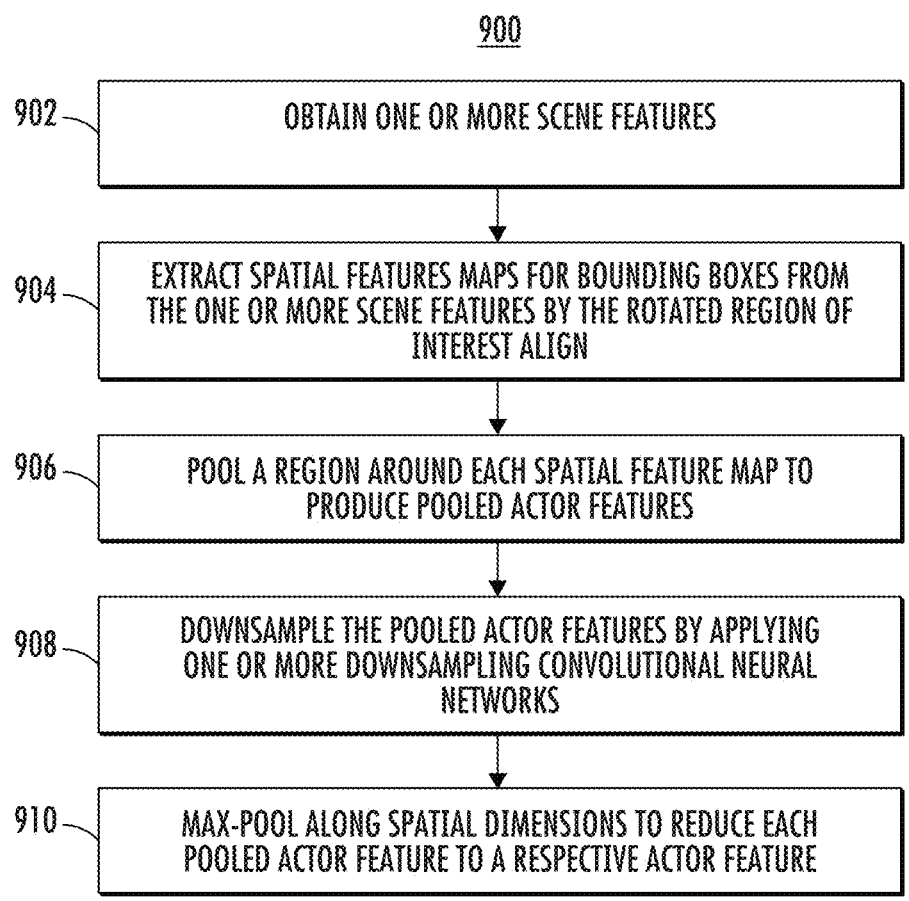
FIG. 9 depicts a flow chart diagram of an example method for recognizing actor features from scene features according to example aspects of the present disclosure.

FIG. 9 depicts a flow chart diagram of an example method 900 for recognizing actor features from scene features according to example aspects of the present disclosure. One or more portions of the method 900 described herein can be implemented as an algorithm on the hardware components of the devices described herein (e.g., as in FIGS. 1, 2, 12, 13) to, for example, generate scenarios using parametric modeling and conducting simulations to test autonomous vehicle (e.g., autonomous vehicle 105 in FIG. 1) using those generated scenarios. Although FIG. 9 depicts steps performed in a particular order for purposes of illustration and discussion, method 900 of FIG. 9 is not limited to the particularly illustrated order or arrangement. The various steps of the methods disclosed herein can be omitted, rearranged, combined, and/or adapted in various ways without deviating from the scope of the present disclosure. The various steps are described, for example, as being performed by a computing system onboard an autonomous vehicle for example purposes. One or more portions could also, or alternatively, be performed by a system offboard/remote from the autonomous vehicle.

For instance, the method 900 can include, at 902, obtaining (e.g., by a computing system including one or more computing devices) one or more scene observations. The scene observations can be or can include data descriptive of sensor observations from one or more sensors configured to observe the scene, such as, for example, one or more sensors mounted on an autonomous vehicle. The sensors can be any suitable sensors, such as, for example, cameras, LIDAR sensors, etc. As one example, in some implementations, the scene observations can be and/or can include a three-dimensional (3D) LIDAR point cloud. In some implementations, the LIDAR data can be voxelized. In some implementations, the scene observations can be oriented in a "Birds-Eye View" (BEV) or top-down representation.

In some implementations, the scene observations can additionally include map data, such as data descriptive of properties of roads, crosswalks, signage, intersections, railroads, buildings, and/or other terrain features of the scene. In some implementations, the map data can be rasterized. The map data can encode traffic elements such as intersections, lanes, roads, and traffic lights. In some implementations, elements with different semantics are encoded into different channels in the raster. Map elements that are rasterized can be or can include, for example, drivable surface polygons, road polygons, intersection polygons, straight vehicle lane polygons, dedicated left and right vehicle lane polygons, dedicated bike lane polygons, dedicated bus lane polygons, centerline markers for all lanes, lane dividers for all lanes with semantics (e.g., allowed to cross, not allowed to cross, might be allowed to cross.

In some implementations, the height dimension of the sensor observations can be normalized with dense ground-height information provided by map data. In some implementations, multiple LiDAR sweeps can be used to exploit motion cues by compensating the ego-motion, such as by projecting the past sweeps to the coordinate frame of the current sweep). Furthermore, in some implementations, the height and time dimension is raveled into the channel dimension, to provide for the use of 2D convolution to process spatial and/or temporal information efficiently. The final representation may thus be a 3D occupancy tensor.

The method 900 can include, at 904, extracting (e.g., by a computing system) spatial feature maps for bounding boxes from the one or more scene features by rotated region of interest (ROI) align. Rotated ROI align can be applied to extract (e.g., fixed size) spatial feature maps for bounding boxes with arbitrary shapes and rotations from the scene features (e.g., the global feature map extracted by the backbone). For instance, rotated ROI align can provide actor contexts for each actor.

The method 900 can include, at 906, pooling (e.g., by the computing system) a region around each spatial feature map to produce pooled actor features. For instance, a region around each actor in its frame can be pooled, such as with an axis defined by the actor's centroid orientation. The pooled actor features may be larger than the eventual actor features.

The method 900 can include, at 908, downsampling (e.g., by the computing system) the pooled actor features by applying one or more downsampling convolutional neural networks. As one example, a 4-layer down-sampling convolutional network can be applied.

The method 900 can include, at 910, max-pooling (e.g., by the computing system) along spatial dimensions to reduce each pooled actor feature to a respective actor feature of the one or more actor features. For instance, after the downsampling CNN is applied, it can be followed by max-pooling along the spatial dimensions to reduce the feature map to a desired dimensional feature vector per actor. One example convolutional network uses a dilation factor of 2 for the convolutional layers to enlarge the receptive field for the per-actor features, which can improve performance.

Figure 10:
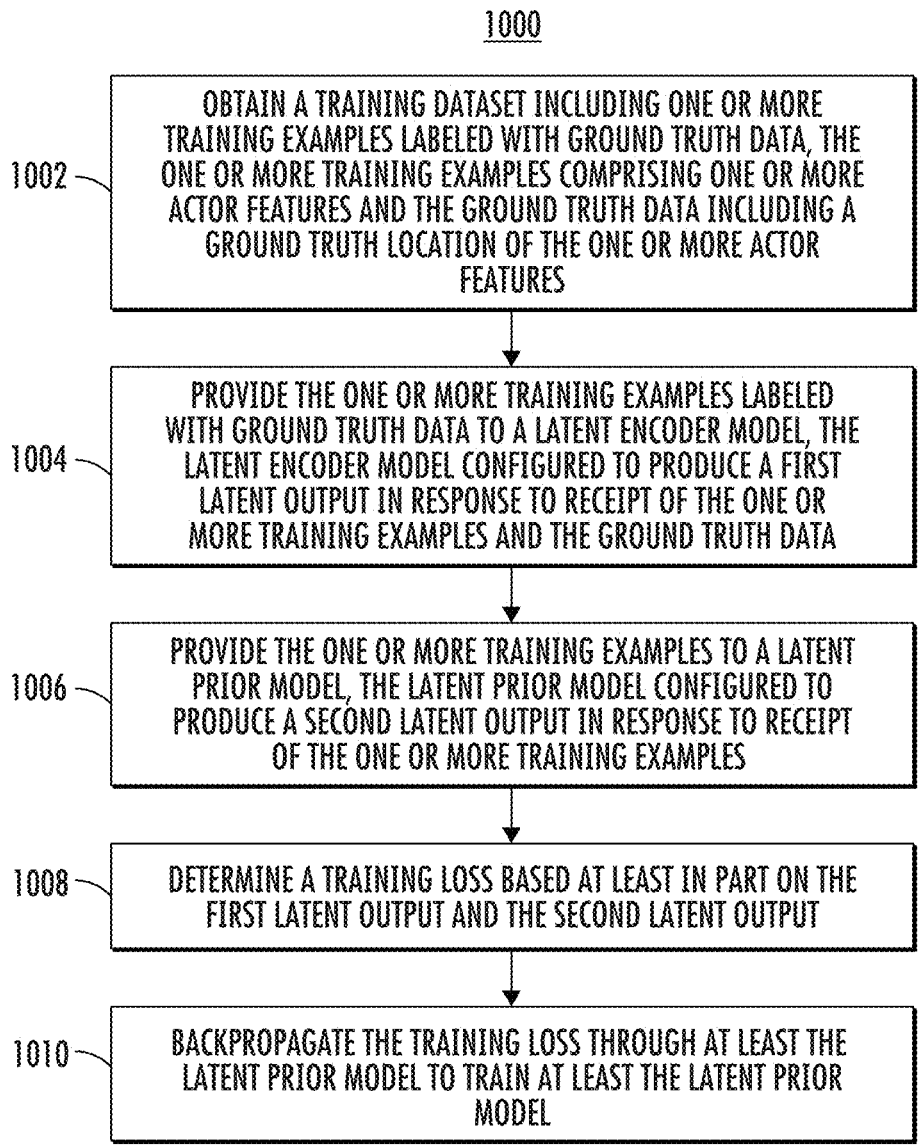
FIG. 10 depicts a flow chart diagram of an example method for training a motion forecasting system according to example aspects of the present disclosure.

FIG. 10 depicts a flow chart diagram of an example method 1000 for training a motion forecasting system according to example aspects of the present disclosure. One or more portions of the method 1000 described herein can be implemented as an algorithm on the hardware components of the devices described herein (e.g., as in FIGS. 1, 2, 12, 13) to, for example, generate scenarios using parametric modeling and conducting simulations to test autonomous vehicle (e.g., autonomous vehicle 105 in FIG. 1) using those generated scenarios. Although FIG. 10 depicts steps performed in a particular order for purposes of illustration and discussion, method 1000 of FIG. 10 is not limited to the particularly illustrated order or arrangement. The various steps of the methods disclosed herein can be omitted, rearranged, combined, and/or adapted in various ways without deviating from the scope of the present disclosure. The various steps are described, for example, as being performed by a computing system onboard an autonomous vehicle for example purposes. One or more portions could also, or alternatively, be performed by a system offboard/remote from the autonomous vehicle.

The method 1000 can include, at 1002, obtaining (e.g., by a computing system including one or more computing devices) a training dataset including one or more training examples labeled with ground truth data. For instance, the one or more training examples can include one or more actor features. Additionally and/or alternatively, the ground truth data can include a ground truth context of the one or more actor features. The ground truth context can be descriptive of a known context of the actor features, such as a known position, pose, velocity, etc.

The method 1000 can include, at 1004, providing (e.g., by the computing system) the one or more training examples labeled with ground truth data to a latent encoder model. The latent encoder model can be configured to produce a first latent distribution in response to receipt of the one or more training examples and the ground truth data. For instance, in some cases, integration over the scene latent distribution is intractable, in which case amortized variational inference can be used. For instance, by introducing an encoder distribution to approximate the true posterior, the learning problem can be reformulated as a maximization of the Evidence Lower BOund (ELBO). In some implementations, the latent encoder model can include a scene interaction module. For instance, after running one round of message passing, the scene interaction module can predict the distribution over latent variables.

The encoder model can approximate the true posterior latent distribution. This model may also be called a recognition network. Because the encoder model receives the ground truth data (e.g., the target output) as an input, it can recognize scene dynamics that are unobserved by the latent prior model. In this manner, the encoder may only be used during training, since it requires access to the ground-truth future trajectories. For instance, the encoder may be omitted from deployed models and/or included at an online training system.

The method 1000 can include, at 1006, providing (e.g., by the computing system) the one or more training examples to a latent prior model. The latent prior model can be configured to produce a second latent distribution in response to receipt of the one or more training examples. For instance, the latent prior model can be agnostic to the ground truth data such that the latent prior model is usable during inference (e.g., during prediction after ground truth data has already been used to train the latent prior model).

The method 1000 can include, at 1008, determining (e.g., by the computing system) a training loss based at least in part on the first latent distribution and the second latent distribution. The training loss can be or can include various losses from components of the model. For instance, in some implementations, the training loss can be or can include a KL divergence loss between the first latent distribution and the second latent distribution.

Additionally and/or alternatively, in some implementations, the training loss can include a feature loss. The feature loss can be a loss in recognized features and/or actors. For instance, the feature loss can be determined by providing (e.g., by the computing system) training scene observations to a feature extraction model. The feature extraction model can be or can include a scene feature extraction model and/or an actor feature recognition model. Determining the feature loss can further include receiving (e.g., by the computing system) one or more predicted features from the feature extraction model. Determining the feature loss can further include determining (e.g., by the computing system) a feature loss between the one or more predicted features and the ground truth data. The feature loss can include a cross-entropy loss between the one or more predicted features and one or more training features of the ground truth data. Additionally and/or alternatively, the feature loss can include a regression loss between bounding boxes of the one or more predicted features and bounding boxes of the ground truth data. For instance, in some implementations, the feature loss includes a cross entropy loss applied to detection scores of the predicted features and/or a smooth L1 applied to the bounding box regression targets of the one or more predicted features.

The method 1000 can include, at 1010, backpropagating (e.g., by the computing system) the training loss through at least the latent prior model to train at least the latent prior model. For instance, the training loss can be backpropagated through some or all trainable portions of the implicit latent variable model, such as an object detection or feature extraction model, latent prior model, decoder model, encoder model, etc.

In some implementations, the training loss can include a reconstruction loss. For instance, the reconstruction loss can be obtained by sampling (e.g., by the computing system) the first latent distribution to produce one or more first latent samples. The first latent distribution can include first sample data, such as a first set of samples from the latent distribution. Determining the reconstruction loss can further include sampling (e.g., by the computing system) the second latent distribution to produce one or more second latent samples. Determining the reconstruction loss can further include providing (e.g., by the computing system) the one or more first latent samples to a decoder model and receiving (e.g., by the computing system) one or more first predicted trajectories from the decoder model. The first predicted trajectories can be representative of a first possible future of the actor features. Determining the reconstruction loss can further include providing (e.g., by the computing system) the one or more second latent samples to the decoder model and receiving (e.g., by the computing system) one or more second predicted trajectories from the decoder model. The second predicted trajectories can be representative of a second possible future of the actor features that desirably matches the first possible future. Determining the reconstruction loss can include determining (e.g., by the computing system) a reconstruction loss based at least in part on the one or more first predicted trajectories and the one or more second predicted trajectories. For instance, the reconstruction loss can be based at least in part on a difference between the one or more first predicted trajectories and the one or more second predicted trajectories. In some implementations, the reconstruction loss can include a Huber loss.

Figure 11:
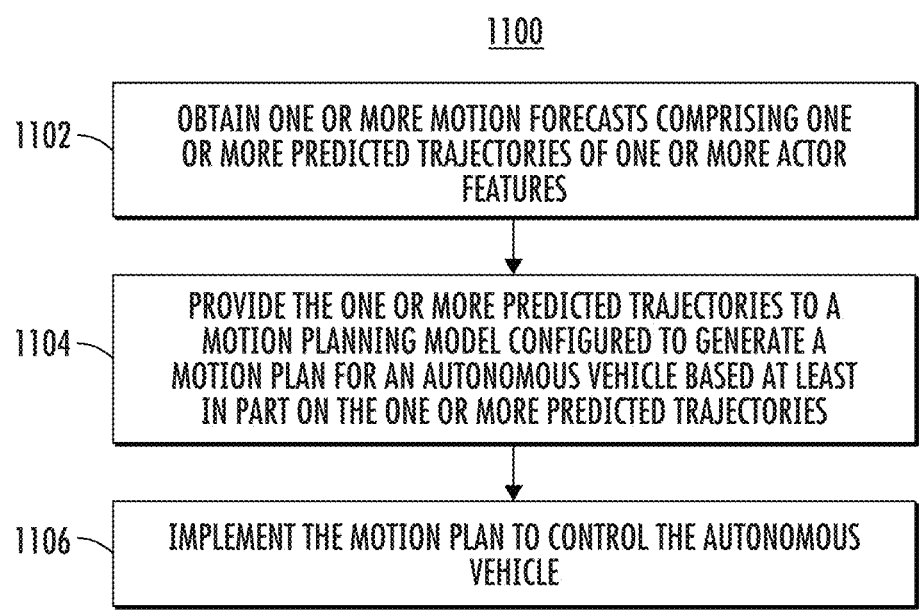
FIG. 11 depicts a flow chart diagram of an example method for controlling an autonomous vehicle according to example aspects of the present disclosure.

FIG. 11 depicts a flow chart diagram of an example method 1100 for controlling an autonomous vehicle according to example aspects of the present disclosure. One or more portions of the method 1100 described herein can be implemented as an algorithm on the hardware components of the devices described herein (e.g., as in FIGS. 1, 2, 12, 13) to, for example, generate scenarios using parametric modeling and conducting simulations to test autonomous vehicle (e.g., autonomous vehicle 105 in FIG. 1) using those generated scenarios. Although FIG. 11 depicts steps performed in a particular order for purposes of illustration and discussion, method 1100 of FIG. 11 is not limited to the particularly illustrated order or arrangement. The various steps of the methods disclosed herein can be omitted, rearranged, combined, and/or adapted in various ways without deviating from the scope of the present disclosure. The various steps are described, for example, as being performed by a computing system onboard an autonomous vehicle for example purposes. One or more portions could also, or alternatively, be performed by a system offboard/remote from the autonomous vehicle.

The method 1100 can include, at 1102, obtaining (e.g., by a computing system including one or more computing devices) one or more motion forecasts including one or more predicted trajectories of one or more actors features. For instance, the one or more predicted trajectories can be obtained from an implicit latent variable model according to example aspects of the present disclosure, such as by a computing device configured to implement any of methods 700, 800, 900, or 1000 of FIGS. 7-10.

The method 1100 can include, at 1104, providing (e.g., by the computing system) the one or more predicted trajectories to a motion planning model configured to generate a motion plan for an autonomous vehicle based at least in part on the one or more predicted trajectories. For instance, the motion planning model can generate a motion plan that safely navigates the scene in view of the predicted trajectories of the actors in the scene.

The method 1100 can include, at 1106, implementing (e.g., by the computing system) the motion plan to control the autonomous vehicle. For instance, one or more control devices (e.g., throttle, brakes, steering, etc.) can be controlled based at least in part on the motion plan to implement the motion plan and thus navigate the autonomous vehicle.

Figure 12:
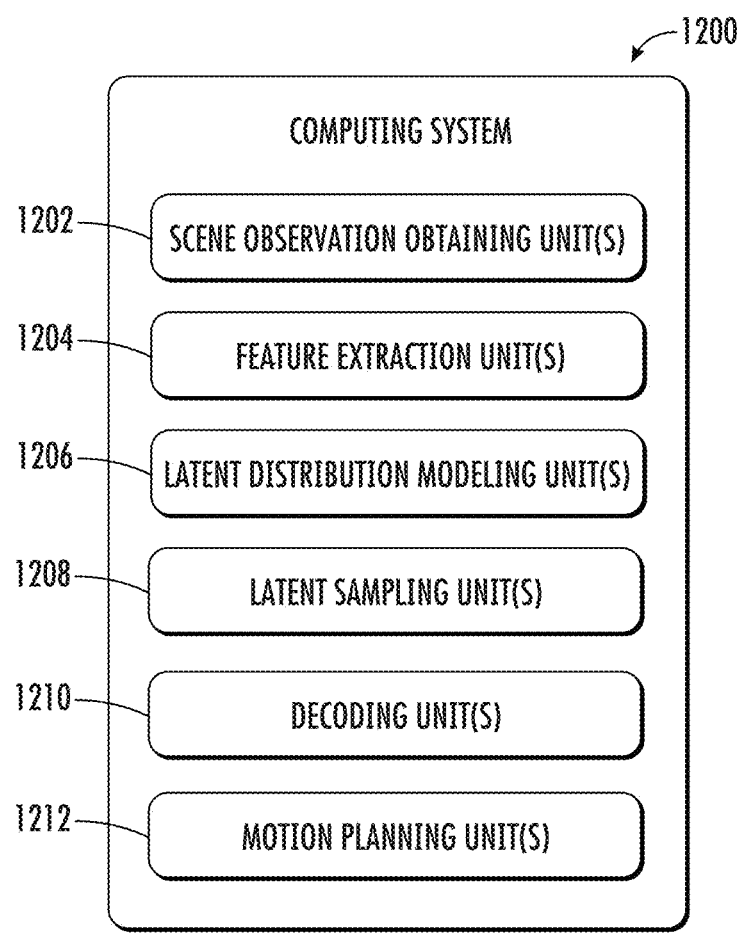
FIG. 12 depicts a block diagram of a first example computing system according to example aspects of the present disclosure.

FIG. 12 depicts a block diagram of a first example computing system 1200 according to example aspects of the present disclosure. Various means can be configured to perform the methods and processes described herein. FIG. 12 depicts example units associated with a computing system for performing operations and functions according to example embodiments of the present disclosure. As depicted, FIG. 12 depicts a computing system 1200 that can include, but is not limited to, scene observation obtaining unit(s) 1202; feature extraction unit(s) 1204; latent distribution modeling unit(s) 1206; latent sampling unit(s) 1208; decoding unit(s) 1210; and motion planning unit(s) 1212. In some implementations, one or more units may be implemented separately. In some implementations, one or more units may be included in one or more other units.

The means can be programmed to perform one or more algorithm(s) for carrying out the operations and functions described herein (including the claims). For instance, the means can be configured to obtain one or more scene observations. For example, a computing system can obtain the scene observations from one or more sensors, one or more databases, etc. A scene observation obtaining unit 1202 is one example of a means for obtaining one or more scene observations.

The means can be configured to extract one or more actor features from the one or more scene observations. For instance, the one or more scene observations can be provided to a feature extraction model. A feature extraction unit 1204 is one example of a means for extracting one or more actor features from the one or more scene observations.

The means can be configured to model a latent distribution from the one or more actor features. For example, a latent prior model can be configured to produce a latent distribution, such as a distributed latent distribution, based on the one or more actor features. A latent distribution modeling unit 1206 is one example of a means for modeling the latent distribution.

The means can be configured to sample the latent distribution to obtain latent sample data. For example, samples of the latent distribution can be obtained based at least in part on the latent distribution. A latent sampling unit 1208 is one example of a means for sampling the latent distribution.

The means can be configured to decode the latent samples to produce a motion forecast including one or more predicted trajectories. For example, the latent sample data can be provided to a decoder model (e.g., a deterministic decoder) to produce the motion forecast. A decoding unit 1210 is one example of a means for decoding the latent samples.

The means can be configured to determine a motion plan (e.g., for an autonomous vehicle. For example, a motion plan can be produced to allow an autonomous vehicle to safely and/or comfortably navigate a scene based at least in part on the motion forecast. A motion planning unit 1212 is one example of a means for determining a motion plan.

In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

Figure 13:
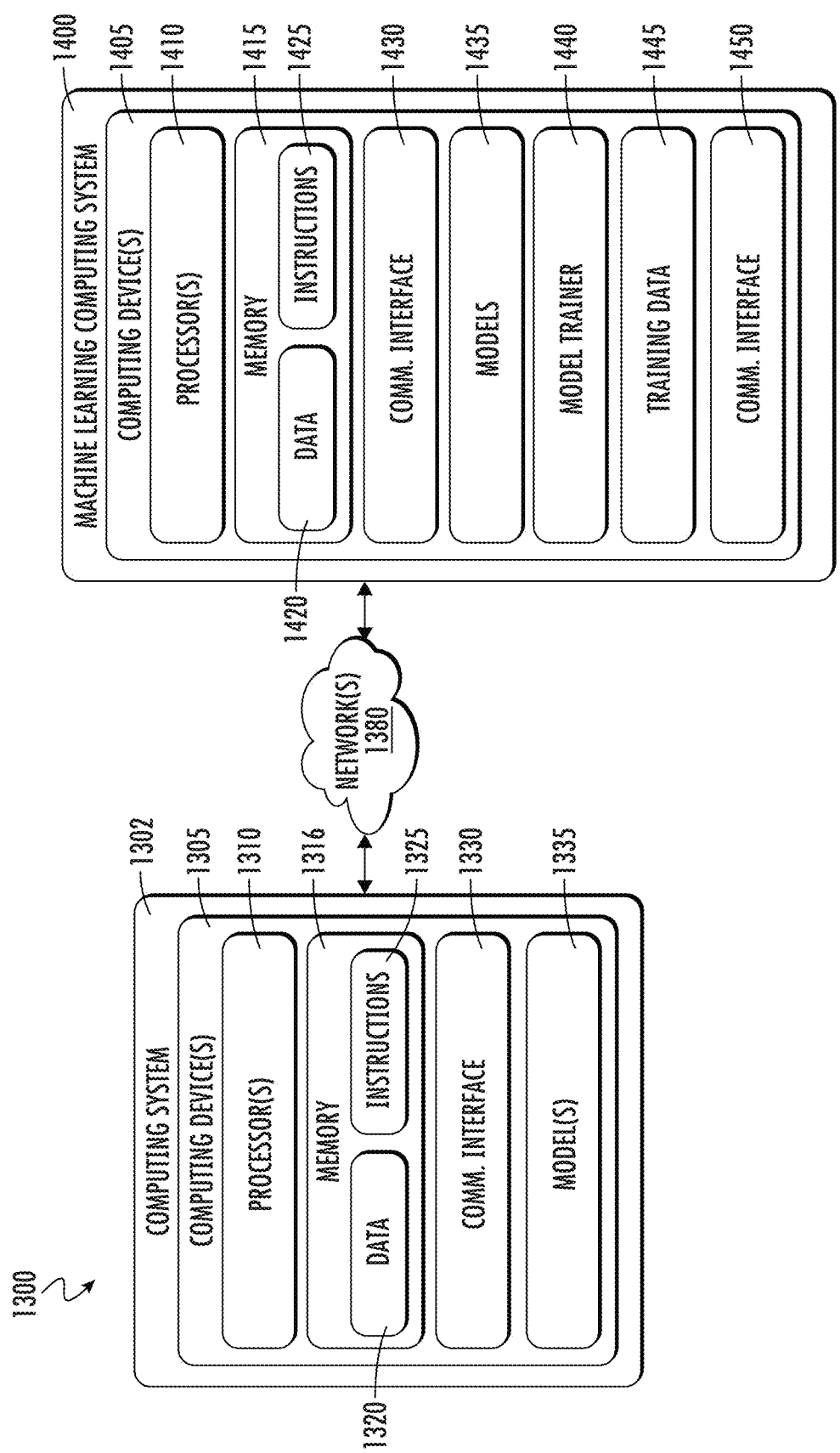
FIG. 13 depicts a block diagram of a second example computing system according to example aspects of the present disclosure.

FIG. 13 depicts a block diagram of a second example computing system 1300 according to example aspects of the present disclosure. The example system 1300 includes a computing system 1302 and a machine learning computing system 1400 that are communicatively coupled over one or more networks 1380. The computing system 1302 can include one or more computing devices 1305.

In some implementations, the computing device(s) 1305 can perform motion forecasting using an implicit latent variable model according to example aspects of the present disclosure. In some implementations, the computing device(s) 1305 can be included in an autonomous vehicle. For example, the computing device(s) 1305 can be on-board the autonomous vehicle. In other implementations, the computing device(s) 1305 is not located on-board the autonomous vehicle. For example, the computing device(s) 1305 can operate offline to predict future trajectories of one or more actors. The computing device(s) 1305 can include one or more distinct physical computing devices.

The computing device(s) 1305 can include one or more processors 1310 and a memory 1315. The one or more processors 1310 can be any suitable processing device (e.g., a processor core, a microprocessor, an ASIC, a FPGA, a controller, a microcontroller, etc.) and can be one processor or a plurality of processors that are operatively connected. The memory 1315 can include one or more non-transitory computer-readable storage media, such as RAM, ROM, EEPROM, EPROM, one or more memory devices, flash memory devices, etc., and combinations thereof.

The memory 1315 can store information that can be accessed by the one or more processors 1310. For instance, the memory 1315 (e.g., one or more non-transitory computer-readable storage mediums, memory devices) can store data 1320 that can be obtained, received, accessed, written, manipulated, created, and/or stored. The data 1320 can include, for instance, sensor data, map data, feature data, etc. as described herein. In some implementations, the computing system 1302 can obtain data from one or more memory device(s) that are remote from the computing system 1302.

The memory 1315 can also store computer-readable instructions 1325 that can be executed by the one or more processors 1320. The instructions 1325 can be software written in any suitable programming language or can be implemented in hardware. Additionally, or alternatively, the instructions 1325 can be executed in logically and/or virtually separate threads on processor(s) 1310.

For example, the memory 1315 can store instructions 1325 that when executed by the one or more processors 1310 cause the one or more processors 1310 (the computing system) to perform any of the operations and/or functions described herein, including, for example, obtaining scene data, obtaining scene latent data, etc.

According to an aspect of the present disclosure, the computing device(s) 1305 can store or include one or more machine-learned models 1335. As examples, the machine-learned models 1335 can be or can otherwise include various machine-learned models such as, for example, scene feature extraction models, actor feature recognition models, latent prior models, encoder models, and/or decoder models as described herein. Such machine-learned models 1335 can respectively include one or more neural networks (e.g., deep neural networks) including graph neural networks, support vector machines, decision trees, ensemble models, k-nearest neighbors models, Bayesian networks, or other types of models including linear models and/or non-linear models. Other example neural networks include feed-forward neural networks, recurrent neural networks (e.g., long short-term memory recurrent neural networks), convolutional neural networks, or other forms of neural networks.

In some implementations, the computing system 1302 can receive the one or more machine-learned models 1335 from the machine learning computing system 1400 over network(s) 1380 and can store the one or more machine-learned models 1335 in the memory 1315. The computing system 1302 can then use or otherwise implement the one or more machine-learned models 1335 (e.g., by processor(s) 1310). In particular, the computing system 1302 can implement the machine learned model(s) 1335 to produce one or more predicted trajectories as described herein.

The machine learning computing system 1400 can include one or more computing devices 1405. The machine learning computing system 1400 can include one or more processors 1410 and a memory 1415. The one or more processors 1410 can be any suitable processing device (e.g., a processor core, a microprocessor, an ASIC, a FPGA, a controller, a microcontroller, etc.) and can be one processor or a plurality of processors that are operatively connected. The memory 1415 can include one or more non-transitory computer-readable storage media, such as RAM, ROM, EEPROM, EPROM, one or more memory devices, flash memory devices, etc., and combinations thereof.

The memory 1415 can store information that can be accessed by the one or more processors 1410. For instance, the memory 1415 (e.g., one or more non-transitory computer-readable storage mediums, memory devices) can store data 1420 that can be obtained, received, accessed, written, manipulated, created, and/or stored. The data 1420 can include, for instance, training feature data including ground truth data as described herein. In some implementations, the machine learning computing system 1400 can obtain data from one or more memory device(s) that are remote from the machine learning computing system 1400.

The memory 1410 can also store computer-readable instructions 1425 that can be executed by the one or more processors 1410. The instructions 1425 can be software written in any suitable programming language or can be implemented in hardware. Additionally, or alternatively, the instructions 1425 can be executed in logically and/or virtually separate threads on processor(s) 1410.

For example, the memory 1415 can store instructions 1425 that when executed by the one or more processors 1410 cause the one or more processors 1410 (the computing system) to perform any of the operations and/or functions described herein, including, for example, determining a feature loss and/or backpropagating the feature loss.

In some implementations, the machine learning computing system 1400 includes one or more server computing devices. If the machine learning computing system 1400 includes multiple server computing devices, such server computing devices can operate according to various computing architectures, including, for example, sequential computing architectures, parallel computing architectures, or some combination thereof.

In addition or alternatively to the model(s) 1335 at the computing system 1302, the machine learning computing system 1400 can include one or more machine-learned models 1435. As examples, the machine-learned models 1435 can be or can otherwise include various machine-learned models such as, for example, scene feature extraction models, actor feature recognition models, latent prior models, encoder models, and/or decoder models as described herein. Such machine-learned models 1435 can respectively include one or more neural networks (e.g., deep neural networks) including graph neural networks, support vector machines, decision trees, ensemble models, k-nearest neighbors models, Bayesian networks, or other types of models including linear models and/or non-linear models. Other example neural networks include feed-forward neural networks, recurrent neural networks (e.g., long short-term memory recurrent neural networks), convolutional neural networks, or other forms of neural networks.

As an example, the machine learning computing system 1400 can communicate with the computing system 1302 according to a client-server relationship. For example, the machine learning computing system 1400 can implement the machine-learned models 1435 to provide a web service to the computing system 1302.

Thus, machine-learned models 1335 can located and used at the computing system 1302 and/or machine-learned models 1435 can be located and used at the machine learning computing system 1400.

In some implementations, the machine learning computing system 1400 and/or the computing system 1302 can train the machine-learned models 1335 and/or 1340 through use of a model trainer 1440. The model trainer 1440 can train the machine-learned models 1335 and/or 1440 using one or more training or learning algorithms. One example training technique is backwards propagation of errors. In some implementations, the model trainer 1440 can perform supervised training techniques using a set of labeled training data. In other implementations, the model trainer 1440 can perform unsupervised training techniques using a set of unlabeled training data. The model trainer 1440 can perform a number of generalization techniques to improve the generalization capability of the models being trained. Generalization techniques include weight decays, dropouts, or other techniques.

In particular, the model trainer 1440 can train a machine-learned model 1335 and/or 1435 based on a set of training data 1445. The training data 1445 can include, for example, training features (e.g., actor features) having known ground truth information stored in ground truth data. The model trainer 1440 can be implemented in hardware, firmware, and/or software controlling one or more processors.

The computing system 1302 and the machine learning computing system 1400 can each include a communication interface 1330 and 1450, respectively. The communication interfaces 1330/1450 can be used to communicate with one or more systems or devices, including systems or devices that are remotely located from the computing system 1302 and the machine learning computing system 1400. A communication interface 1330/1450 can include any circuits, components, software, etc. for communicating with one or more networks (e.g., 1380). In some implementations, a communication interface 1330/1450 can include, for example, one or more of a communications controller, receiver, transceiver, transmitter, port, conductors, software and/or hardware for communicating data.

The network(s) 1380 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1380 can be accomplished, for instance, via a network interface using any type of protocol, protection scheme, encoding, format, packaging, etc.

FIG. 13 illustrates one example computing system 1300 that can be used to implement the present disclosure. Other computing systems can be used as well. For example, in some implementations, the computing system 1302 can include the model trainer 1440 and the training dataset 1445. In such implementations, the machine-learned models 1440 can be both trained and used locally at the computing system 1302. As another example, in some implementations, the computing system 1302 is not connected to other computing systems.

In addition, components illustrated and/or discussed as being included in one of the computing systems 1302 or 1400 can instead be included in another of the computing systems 1302 or 1400. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for determining scene-consistent motion forecasts from sensor data, the method comprising:
obtaining, by a computing system comprising one or more computing devices, scene data comprising one or more actor features;
providing, by the computing system, the scene data to a latent prior model, the latent prior model configured to generate scene latent data in response to receipt of scene data, the scene latent data comprising a latent distribution that is partitioned into one or more latent variables, wherein the one or more latent variables encode unobserved dynamics relative to a respective actor feature of the one or more actor features;
obtaining, by the computing system, the scene latent data from the latent prior model;
sampling, by the computing system, latent sample data from the scene latent data;
providing, by the computing system, the latent sample data to a decoder model, the decoder model configured to decode the latent sample data into a motion forecast comprising one or more predicted trajectories of the one or more actor features; and
receiving, by the computing system, the motion forecast comprising one or more predicted trajectories of the one or more actor features from the decoder model;
providing, by the computing system, the one or more predicted trajectories to a motion planning model configured to generate a motion plan for an autonomous vehicle based at least in part on the one or more predicted trajectories; and
implementing, by the computing system, the motion plan to control the autonomous vehicle.

2. The computer-implemented method of claim 1, wherein the decoder model comprises a deterministic decoder model.

3. The computer-implemented method of claim 1, wherein the decoder model comprises a specified and tractable conditional likelihood.

4. The computer-implemented method of claim 1, wherein the one or more latent variables comprise one or more continuous latent variables.

5. The computer-implemented method of claim 1, further comprising:
obtaining, by the computing system, one or more scene observations;
providing, by the computing system, the one or more scene observations to a scene feature extraction model, the scene feature extraction model comprising one or more neural networks configured to extract one or more scene features from the one or more scene observations;
receiving, by the computing system, the one or more scene features from the scene feature extraction model;
providing, by the computing system, the one or more scene features to an actor feature recognition model, the actor feature recognition model configured to:
extract spatial feature maps for bounding boxes from the one or more scene features by rotated region of interest align;
pool a region around each spatial feature map to produce pooled actor features;
downsample the pooled actor features by applying one or more downsampling convolutional neural networks; and
max-pool along spatial dimensions to reduce each pooled actor feature to a respective actor feature of the one or more actor features; and
receiving, by the computing system, the one or more actor features from the actor feature recognition model.

6. The computer-implemented method of claim 1, further comprising:
sampling, by the computing system, second latent sample data from the scene latent data;
providing, by the computing system, the second latent sample data to the decoder model; and
receiving, by the computing system, a second motion forecast comprising one or more second predicted trajectories of the one or more actor features from the decoder model.

7. The computer-implemented method of claim 1, wherein at least one of the latent prior model or the decoder model comprises a scene interaction model configured to model the latent distribution as an interaction graph comprising one or more nodes representative of the one or more actor features and one or more edges representative of interactions between the one or more actor features.

8. The computer-implemented method of claim 7, wherein the scene interaction model comprises one or more graph neural networks.

9. The computer-implemented method of claim 8, wherein a message function of the one or more graph neural networks comprises a multi-layer perceptron model that takes as input one or more terminal nodes of the one or more nodes at a previous propagation step of the one or more graph neural networks.

10. The computer-implemented method of claim 8, wherein an aggregation function of the one or more graph neural networks comprises a feature-wise max-pooling aggregation function.

11. The computer-implemented method of claim 8, wherein a gated recurrent unit cell is configured to update a state of the one or more nodes.

12. The computer-implemented method of claim 1, wherein the one or more actor features comprise data descriptive of a context of one or more traffic participants.

13. The computer-implemented method of claim 1, wherein the unobserved dynamics relative to the respective actor feature of the one or more actor features comprise at least one of interactions with neighboring actor features of the respective actor feature or traffic rules that apply in a locality of the respective actor feature.

14. A computer-implemented method of training a motion forecasting system, the method comprising:
obtaining, by a computing system comprising one or more computing devices, a training dataset comprising one or more training examples labeled with ground truth data, the one or more training examples comprising one or more actor features and the ground truth data comprising a ground truth context of the one or more actor features;
providing, by the computing system, the one or more training examples labeled with ground truth data to a latent encoder model, the latent encoder model configured to produce a first latent distribution in response to receipt of the one or more training examples and the ground truth data;
providing, by the computing system, the one or more training examples to a latent prior model, the latent prior model configured to produce a second latent distribution in response to receipt of the one or more training examples;

determining, by the computing system, a training loss based at least in part on the first latent distribution and the second latent distribution; and backpropagating, by the computing system, the training loss through at least the latent prior model to train at least the latent prior model.

15. The computer-implemented method of claim 14, wherein the training loss comprises a KL divergence loss between the first latent distribution and the second latent distribution.

16. The computer-implemented method of claim 14, wherein the method further comprises:

providing, by the computing system, training scene observations to a feature extraction model;

receiving, by the computing system, one or more predicted features from the feature extraction model; and determining, by the computing system, a feature loss between the one or more predicted features and the ground truth data;

wherein the training loss comprises the feature loss.

17. The computer-implemented method of claim 16, wherein the feature loss comprises a cross-entropy loss between the one or more predicted features and one or more training features of the ground truth data and a regression loss between bounding boxes of the one or more predicted features and bounding boxes of the ground truth data.

18. The computer-implemented method of claim 14, further comprising:

sampling, by the computing system, the first latent distribution to produce one or more first latent samples;

sampling, by the computing system, the second latent distribution to produce one or more second latent samples;

providing, by the computing system, the one or more first latent samples to a decoder model;

receiving, by the computing system, one or more first predicted trajectories from the decoder model;

providing, by the computing system, the one or more second latent samples to the decoder model;

receiving, by the computing system, one or more second predicted trajectories from the decoder model; and determining, by the computing system, a reconstruction loss based at least in part on the one or more first predicted trajectories and the one or more second predicted trajectories;

wherein the training loss comprises the reconstruction loss.

19. The computer-implemented method of claim 18, wherein the reconstruction loss comprises a Huber loss.

20. A computer-implemented method of operating an autonomous vehicle, the method comprising:

obtaining, by the computing system, one or more scene observations;

providing, by the computing system, the one or more scene observations to a feature extraction model, the feature extraction model configured to produce scene data comprising one or more actor features from the one or more scene observations;

receiving, by the computing system, the scene data comprising one or more actor features from the feature extraction model;

providing, by the computing system, the scene data to a latent prior model, the latent prior model configured to generate scene latent data in response to receipt of scene data, the scene latent data comprising a latent distribution that is partitioned into one or more latent variables, wherein the one or more latent variables encode unobserved dynamics relative to a respective actor feature of the one or more actor features;

obtaining, by the computing system, the scene latent data from the latent prior model;

sampling, by the computing system, one or more latent samples from the scene latent data;

providing, by the computing system, the one or more latent samples to a decoder model, the decoder model configured to decode the latent samples into a motion forecast comprising one or more predicted trajectories of the one or more actor features;

obtaining, by the computing system, one or more motion forecasts comprising one or more predicted trajectories of the one or more actor features from the decoder model;

providing, by the computing system, the one or more predicted trajectories to a motion planning model configured to generate a motion plan for an autonomous vehicle based at least in part on the one or more predicted trajectories; and implementing, by the computing system, the motion plan to control the autonomous vehicle.

\* \* \* \* \*

UNITED STATES PATENT AND TRADEMARK OFFICE
CERTIFICATE OF CORRECTION

| | |
|---|---|
| PATENT NO. | : 11,842,530 B2 |
| APPLICATION NO. | : 17/150995 |
| DATED | : December 12, 2023 |
| INVENTOR(S) | : Sergio Casas et al. |

It is certified that error appears in the above-identified patent and that said Letters Patent is hereby corrected as shown below:

In the Claims

Column 53, Line 25, Claim 1, please delete "and"

Signed and Sealed this
Twenty-third Day of January, 2024

*Katherine Kelly Vidal*

Katherine Kelly Vidal
*Director of the United States Patent and Trademark Office*